(12) United States Patent
Snow et al.

(10) Patent No.: US 9,497,173 B2
(45) Date of Patent: Nov. 15, 2016

(54) SYSTEM FOR THE UNIFIED ORGANIZATION, SECURE STORAGE AND SECURE RETRIEVAL OF DIGITAL AND PAPER DOCUMENTS

(71) Applicant: SAFELYFILED.COM, LLC, McHenry, IL (US)

(72) Inventors: Mark Snow, McHenry, IL (US); Susan Hinrichs, Urbana, IL (US)

(73) Assignee: SAFELYFILED.COM, LLC, McHenry, IL (US)

( * ) Notice: Subject to any disclaimer, the term of this patent is extended or adjusted under 35 U.S.C. 154(b) by 123 days.

(21) Appl. No.: 14/417,257

(22) PCT Filed: Jul. 24, 2013

(86) PCT No.: PCT/US2013/051801
§ 371 (c)(1),
(2) Date: Jan. 26, 2015

(87) PCT Pub. No.: WO2014/018614
PCT Pub. Date: Jan. 30, 2014

(65) Prior Publication Data
US 2015/0180833 A1 Jun. 25, 2015

Related U.S. Application Data

(60) Provisional application No. 61/676,494, filed on Jul. 27, 2012.

(51) Int. Cl.
| H04L 29/06 | (2006.01) |
| G06Q 10/10 | (2012.01) |
| G06F 21/62 | (2013.01) |

(52) U.S. Cl.
CPC .......... *H04L 63/045* (2013.01); *G06F 21/6245* (2013.01); *G06Q 10/10* (2013.01); *H04L 63/062* (2013.01)

(58) Field of Classification Search
None
See application file for complete search history.

(56) References Cited

U.S. PATENT DOCUMENTS

| 5,819,263 A * | 10/1998 | Bromley | G06Q 10/10 |
| 6,070,177 A * | 5/2000 | Kao | G06F 17/30 |
| | | | 707/999.01 |

(Continued)

OTHER PUBLICATIONS

International Search Report and Written Opinion mailed Feb. 7, 2014 in International Application Serial No. PCT/US2013/051801.

*Primary Examiner* — Saleh Najjar
*Assistant Examiner* — Simon Kanaan
(74) *Attorney, Agent, or Firm* — Locke Lord LLP

(57) ABSTRACT

A method and system implements storing one or more encrypted electronic documents and document information associated therewith, organizing the one or more electronic documents to facilitate access by a user; and enabling remote secure access to the one or more electronic documents through a user device. The one or more electronic documents are a copy of one or more physical documents or a copy of documents that is not a physical document. The document information of an electronic document includes information on a location of the physical document. The electronic document(s) and the document information are stored in a separate storage databases.

19 Claims, 9 Drawing Sheets

(56) References Cited

U.S. PATENT DOCUMENTS

| | | | |
|---|---|---|---|
| 9,015,803 B1* | 4/2015 | Chaganti | H04L 29/06 713/182 |
| 2003/0051144 A1* | 3/2003 | Williams | G06F 21/6209 713/178 |
| 2007/0294173 A1 | 12/2007 | Levy et al. | |
| 2008/0162602 A1 | 7/2008 | Garg et al. | |
| 2008/0167994 A1* | 7/2008 | Li | G06F 21/10 705/52 |
| 2010/0131851 A1 | 5/2010 | Reese et al. | |
| 2010/0250497 A1 | 9/2010 | Redlich et al. | |
| 2010/0299763 A1 | 11/2010 | Marcus et al. | |
| 2011/0041054 A1 | 2/2011 | Bendik | |
| 2012/0221944 A1* | 8/2012 | Bloomfield | G06Q 10/10 715/255 |
| 2013/0018948 A1* | 1/2013 | Douillet | G06F 9/541 709/204 |
| 2014/0073357 A1* | 3/2014 | Johnson | H04W 76/021 455/456.3 |
| 2015/0180833 A1* | 6/2015 | Snow | G06F 21/6245 713/155 |

* cited by examiner

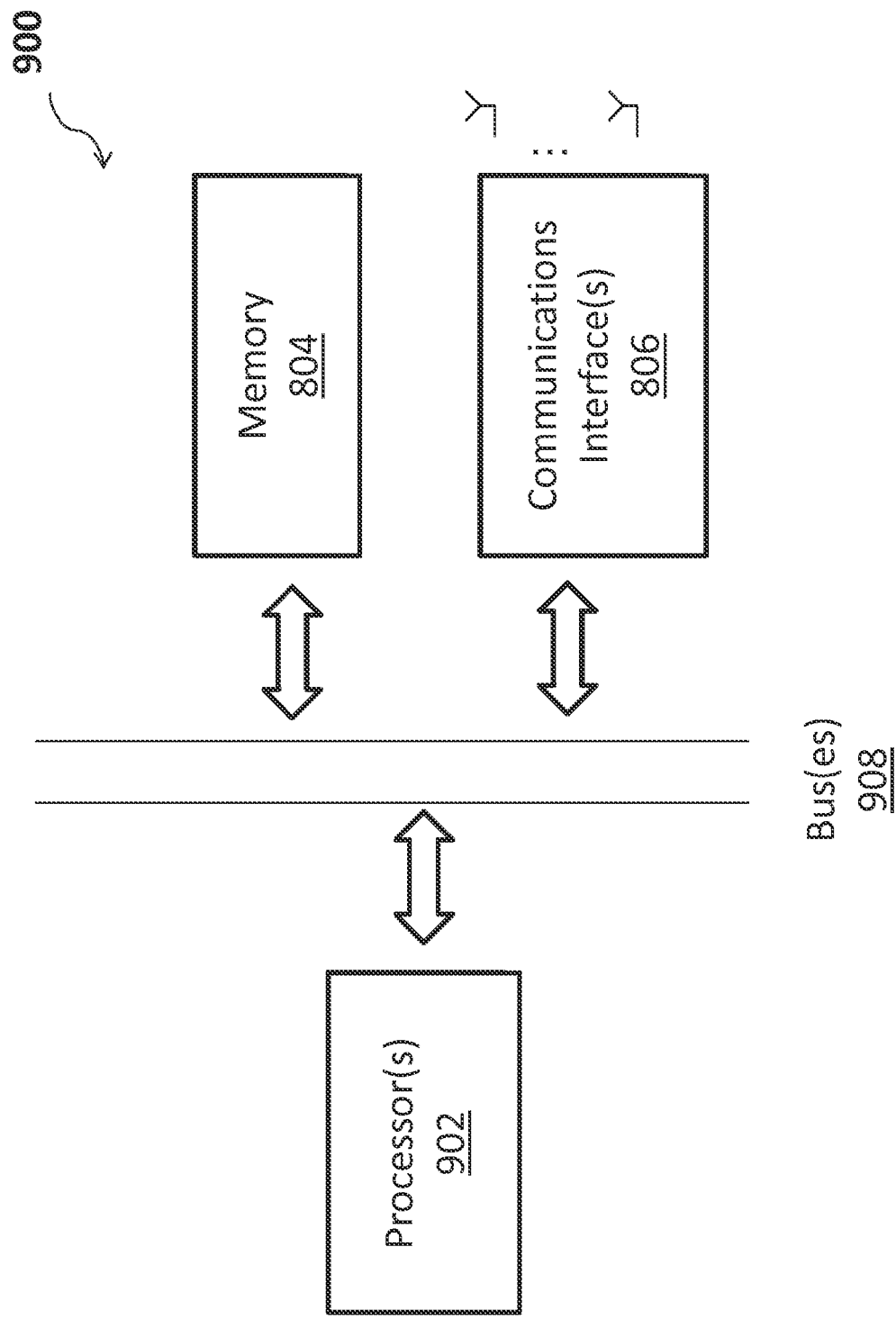

SYSTEM FOR THE UNIFIED ORGANIZATION, SECURE STORAGE AND SECURE RETRIEVAL OF DIGITAL AND PAPER DOCUMENTS

This international application is based on and claims priority to U.S. Provisional Application Ser. No. 61/676,494, filed Jul. 27, 2012, entitled, "SYSTEM FOR THE UNIFIED ORGANIZATION, SECURE STORAGE AND SECURE RETRIEVAL OF DIGITAL AND PAPER PRODUCTS, and of which the entire contents is incorporated herein by reference.

BACKGROUND

I. Field

The present disclosure relates to the field of document management, and more particularly, to a system and method for storing, organizing and accessing electronic (or digital) documents and paper documents.

II. Background

Prior to the introduction of the Internet, most important financial and legal documents were in paper form. As the use of the Internet became widespread and state, federal and some foreign country laws evidenced a trend towards permitting the use of digital documents as a substitute for paper documents for legal purposes, the creators of such documents began a trend of gradually increasing use of digital documents and decreasing the use of paper documents. In most cases, recipients of these documents also increasingly preferred receiving documents in digital form.

However, most individuals still receive and use important documents in both digital and paper form. In certain circumstances, documents like birth certificates, wills and death certificates must be in an original paper form in order to be considered legally valid. In other circumstances, such as in real estate transactions, the common commercial practice still demands paper documents. Finally, many people, especially older people, prefer and demand paper documents instead of digital documents.

The result is that individuals still receive their important documents in paper or digital form, and sometimes in both forms. This can cause difficulty in filing, organizing and locating these documents.

In the past, a common method to organizing documents was to print all documents received in digital form and file them in the physical file folders appropriately labeled, along with the documents originally received in paper form. However, as the trend towards digital documents continues to accelerate, this method has become less and less attractive.

The widespread access to scanning technology, smart phone picture-taking and transmission abilities, coupled with a significant reduction in the cost of digital storage, has enabled individuals and businesses to convert their paper documents into digital form and reverse the prior preferred method of converting the digital documents to paper form for organizing and storage purposes.

However, this method is incomplete and not reliable. It requires significant time and discipline for an individual to convert numerous paper documents to digital form. It requires considerable effort and thought to establish a computer-based filing system. Given the difficulty in determining into which category or categories a particular document might be placed, any ad hoc computerized system of document storage will be very dependent upon user-generated identifiers, such as document file names or placement into subfolders, for search and recovery purposes. Finding a document with a word search capability requires that scanned documents be converted into text, something that cannot only be expensive and time consuming, but is not completely reliable. Computers can crash, and unless the storing drive is backed up, documents can be lost. Further, computers, especially laptops, tablets or smart phones can be stolen, compromising the confidentiality of important documents.

Finally, as individuals become more mobile, possibly misplacing important files as they move their domiciles, and as health care and anti-terrorism laws and regulations make timely, and in some cases emergency, access to such documents important, such documents must be accessible quickly and from many locations.

Though there are organizations that provide hard drive backup services, such services fail to provide for the organization and quick search methods needed by an average computer user, and they do not provide a method to include the organization of paper documents into any such system.

Many organizations, such as insurance companies, offer their customers a secure, on-line view of their insurance policies. However, if a customer is insured by more than one company, the customer must access multiple websites to view all of his or her insurance policies. The necessity of accessing multiple websites and memorizing or storing multiple passwords significantly diminishes the usefulness of such sites for any purpose other than displaying the documents produced by such organization. There is no cross-website organization of all of the user's important documents.

Many financial institutions, including stock brokerage services, provide Internet access to customer accounts. However, a number of individuals are concerned that such institutions have the ability to change, or are vulnerable to malevolent computer hackers who can change, the current and prior statements. Further, many institutions, in an effort to use less paper and reduce mailing costs, encourage their clients to opt for digital statements, thereby eliminating a the potential for a hard copy to compare to prior digital statements. By storing an image of such statements in an account under his or her control, the individual has complete and unchangeable record of such statement, without the inconvenience of storing large volumes of paper statements accumulated over many years.

Accordingly, there is a need for a method to store and organize, and in some cases share, important, legal and financial documents in a secure and uncomplicated manner, in a single website, to have such method be easy for an average computer user to use, to include a search capability that is quick and efficient and not burdensome on the user, and to include a simple structure for including paper originals in such method and for identifying the location of paper originals, when needed.

SUMMARY

In accordance with a disclosed embodiment of the present disclosure, a method and system implements storing one or more encrypted electronic documents and document information associated therewith; organizing the one or more electronic documents to facilitate access by a user; and enabling remote secure access to the one or more electronic documents through a user device. The one or more electronic documents are a copy of one or more physical documents or a copy of documents that are not physical documents or a document that exists in electronic form and has never been printed. The document information of an electronic document includes information on a location of the physical document. The electronic document(s) and the document information are stored in separate storage databases.

The document information can be metadata including user inputted metadata and/or system-generated metadata. The metadata associated with an electronic document can be stored or modified based on user input. Further, the electronic documents can be organized or searched according to their metadata.

In another disclosed embodiment, a user can utilize a computer or other computer-like device equipped with a browser (e.g., a JavaScript enabled browser) and an Internet connection, and access a document management system for the organization, secure storage, and secure retrieval of paper and digital documents. Using a combination of symmetric and asymmetric encryption, name and password authentication and in some cases enhanced authentication utilizing an additional registered device or two or more factor authentication, the user can upload and download documents to a secure database or databases operating at one or more remote locations (the "cloud"), view and print such documents, and organize and tag such documents for later viewing or retrieval through a search capability (or function).

In a further disclosed embodiment, the document management system includes (i) an embedded email system, further enabling the ease of document upload, (ii) an access and security hierarchy, permitting others to view, control or upload selected documents, and (iii) a method for organizing such paper and digital documents.

Organizing, searching, viewing and retrieving paper and digital documents are accomplished through the use of a metadata database, which is originally populated with default entries, but is customizable and expandable by the user. To enable the quick and easy upload and assignment of metadata to each document, a combination of system-generated metadata, user input-tags and user-created drop down menus is utilized.

In yet another disclosed embodiment, a user can utilize the method and system under the sponsorship or a financial, legal or other professional, who would provide for the upload of some documents and incur the charges associated with its use. The method and system can also be utilized without a sponsor, where the user incurs the charges for access to the document management system.

In another disclosed embodiment, a computer-implemented method and system is provided for organizing, storing and accessing personal and business financial, legal and other documents, whether in paper form, digital form, or both, through a document management system. The document management system includes a computer that supports the operations of a website comprising at least a web-based interface, and at least two databases. Access to at least one portion of the web-based interface is limited to administrators, authorized users and third parties designated by users. The computer-implemented method involves (1) providing a first storage database for receiving and storing documents exported thereto through the web-based interface; (2) storing documents in the first storage database in an encrypted manner; (3) providing a second storage database, in either a relational or non-relational form, for storing items of data concerning each document; (4) linking each document in the first storage database with items of data stored in the second storage database, with each item of data either generated by the system or generated by an owner of the document, three items of data being generated by the system and comprising an identification of a party uploading the document, a time and date of the upload and a record of the last three or more times the data has been viewed or altered along with the name of the party who altered or viewed the document; (5) providing two or more dropdown menus of data viewable on the web-based user interface to be selected for association with any document uploaded, the two or more dropdown menus comprising items selected or input by the owner through the web-based user interface to create a dropdown menu that identify the location of the paper original of the document uploaded and a dropdown menu of data items generated by the owner of the document which includes the name of the parties who have access to such documents and the type of access, including upload, download or read-only, and a date such permitted access is no longer available; (6) providing owner-designated and inputted tags that comprise of both a freeform text identifier for the party linked to the document and a dropdown menu of such freeform text identifiers that have been previously input by the owner and a freeform text identifier and a dropdown menu of such freeform text identifiers that have been previously input by the owner for any other purpose; (7) providing an audit trail of all activities involving any document uploaded to the system through the web-based interface or any changes to associated data or any changes to the owner-created drop down menus; (8) providing a check box viewable through the web-based interface that is selectable by the owner of a document and that once selected prompts the owner of such document to input a short free form text message and input a date, or select a date from a predetermined drop-down menu upon which the system generates an email to be sent to the owner, or other party as selected, for reminding the owner to take an action concerning such document, including the transmission in such email of the free form text so entered; (9) providing a drag-and-drop capability for enabling a cursor-controlled upload of documents or images thereof stored on the owner's device directly to the first storage database; (10) providing an email account connected through the web-based user interface that permits the owner to accept emails and upload attachments to such emails without having to export the attachments to the owner's device or other device prior to upload to the first storage database; (11) providing an image compiler for sorting and combining multiple images into a single document; (12) notifying one or more selected third parties of a possible incapacity or death of the owner of a document; (13) allowing the user to identify and assign a third party with all or selected rights, privileges and access to all or selected documents stored in the first storage database and all or selected rights, privileges and access to and rights to make changes to, all data entered into the first and second storage databases that the user can enter or change; (14) allowing the user to identify and assign a third party with rights to view all or selected documents stored in the first storage database and the rights to view the data in all storage databases that the user can view; and (15) providing a combination of symmetric and asymmetric encryption to secure data and documents from unauthorized access.

In accordance with a further disclosed embodiment, the computer-implemented method includes displaying, through a web-based interface, a free form text field for enabling the user to input text concerning any issue, including instructions concerning any matter, that the user desires to have transmitted to any selected party upon a determination that the user is incapacitated or deceased. The computer-implemented method can include displaying, through the web-based interface, a dropdown menu including contact addresses, as one or more addresses to which text is to be sent; and displaying, through the web-based interface, a semi-free form field for input of an contact address not included on the dropdown menu, a form of the contact address being verified for validity as a contact address, to which text is to be sent. Also, the computer-implemented method can include displaying, through the web-based interface, a semi-free form field for input of a contact address, the contact address selected by and accessible to the user, a form of the contact address being verified for validity as a contact address, to which a system-generated notice is to be sent. Further, the computer-implemented method can include displaying, through the web-based interface, a dropdown menu having a time period to be selected by the user, including two weeks, one month, two months, three months, six months, one year, or other time as determined; and transmitting a system-generated notice to a selected contact address of a device or a person or entity on a date on which the selected time period expires, and if no response to the notice is received by the system after expiration of the selected time period, a message is transmitted to a pre-selected device of another person or entity. The contact address can be an address for communicating an email, a text message, a video message, audio message or other electronic or non-electronic communication message.

BRIEF DESCRIPTION OF THE DRAWINGS

The description of the various exemplary embodiments, is explained in conjunction with the appended drawings, in which:

FIG. 9 is a block diagram of exemplary components of a server in accordance with one disclosed embodiment.

DETAILED DESCRIPTION

In accordance with various disclosed embodiments, there is provided a method and document management system for storing, organizing and accessing electronic and paper information.

The method and system can be implemented to provide for the organization and storage of important legal, financial and informational documents, whether in paper or digital form, or both, into one unified on-line system. The system stores and organizes such documents in a manner that enables the owner of the documents to (i) access them remotely, such as from any Internet-connected computing device or network accessible user device, (ii) easily locate the paper originals of such documents, (iii) search such documents, (iv) share such documents with chosen third parties, (v) enable selected third parties to upload documents and (vi) facilitate reminders concerning such documents.

According to a disclosed embodiment, a widely distributed network of communication, computer storage, personal computer and peripheral devices, Internet and network servers and programming software can be utilized to enable individuals to transmit, store, share and retrieve documents in a secure manner. Such a system as described herein can exist in the form of the Internet, the individual's computing device and the connection between such device and the Internet.

Computing devices include, but are not limited to, personal computers, laptops, smartphones and tablets. Connection between the device and Internet include, but are not limited to, such components as wired and wireless networks, broadband, Wide Area Networks and Local Area Networks. The program or software can include, but are not limited to browsers, application programming interfaces, email systems, scanning and imaging software, symmetric and asymmetric key pair generators, and dedicated application programs (or apps) for accessing the document management system across a network.

As described above, the document management system can be utilized by the user under the auspices of a legal, financial or other professional who provides the user with access to the system or a particular user account on the system. For example, the professional incurs any charges associated with the use of the document management system and receives the ability to upload certain documents into the user's folders for a limited time. This party may be called the "sponsor" or other name. The sponsor's name and other information can figure prominently in the headings of the User Interface (UI), such as in the form of a banner. The user can then manage the sponsor's access. In other exemplary implementations, no sponsor exists so that the user incurs all charges and no sponsor name is included in any banner.

An exemplary system environment and processes are described below in further detail.

A. System Environment

Figure 1:
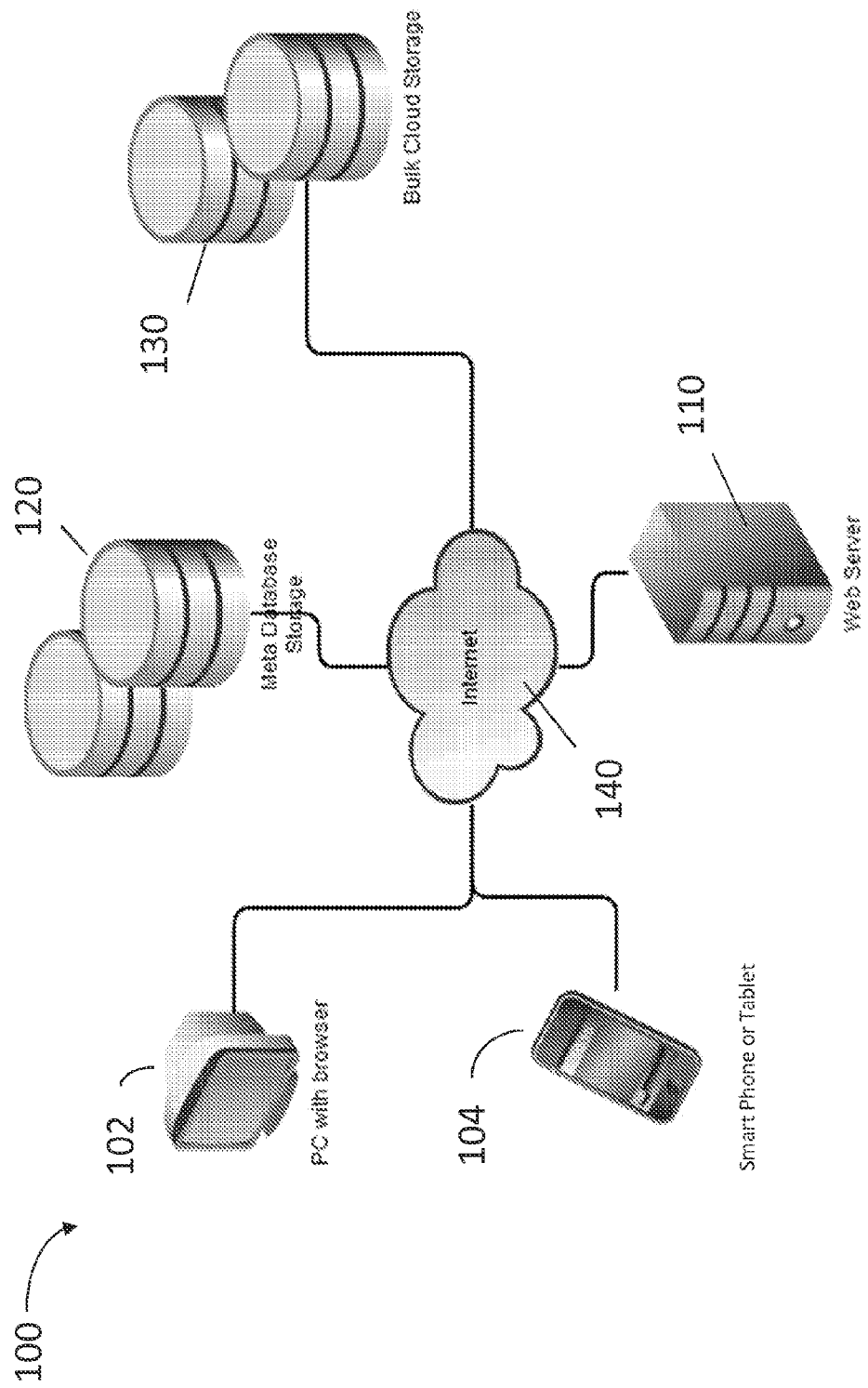
FIG. 1 is a block diagram of an exemplary system environment for storing, organizing and controlling access to documents in accordance with one disclosed embodiment.

FIG. 1 illustrates a block diagram of an exemplary system environment 100 for storing, organizing and accessing electronic or digital documents or files ("electronic documents"). The electronic documents can be electronic cop(ies) of one or more physical documents or electronic documents that have never been in physical form As shown in FIG. 1, the system environment 100 includes one or more user devices, such as a computer 102 and a smart phone or tablet 104. The system environment 100 also includes a document management system implemented through a server(s) 110 and one or more storage databases or database stores such as storage database 120 and storage database 130. These devices and components communicate across a network infrastructure 140, which can include one or more wireless and wire-line networks and can provide access across the Internet. Exemplary components of user devices 102 and 104 and server 110 are described below with reference to FIG. 8 and FIG. 9.

In this example, there are two types of storage databases (120, 130) that are used by the document management system in the system environment 100. The storage database 130 can be a bulk storage data store, and stores electronic documents. The other storage database 120 can be a Structured Query Language (SQL) or non-SQL database system, and can store the data (or information) about the documents and users, such as metadata. The document management system takes advantage of scalable and highly available data stores in the cloud. However, the system may not be able to rely on physical security of the storage servers to secure the data in storage (data at rest), and thus, can be configured to provide a means to secure the sensitive stored data, such as through encryption and authentication, even if the physical storage media is compromised.

For example, sensitive data that is sent between the components is protected by standard network security protocols such as Secure Sockets Layer (SSL), to provide encryption and integrity controls in transit.

Further, every user registered in the document management system has an asymmetric key pair assigned to them. RSA is an example of an asymmetric encryption algorithm. There is a public portion of the key pair and a private portion of the key pair. Anyone can access the public key. They can use the public key to encrypt data. Only the holder of the private key can retrieve the data. The system leverages asymmetric keys to limit access to documents (or files or data) to only those with authorized access to the documents.

In an exemplary embodiment, a user can access the document management system with a user device through a web-based user interface (UI), accessible via the Internet with a browser or the like. The browser is preferably a script-enabled browser. In this example, the user can access a home page, welcome page or sign in page of the document management website, and login (logon) to an existing account using, for example, an account identifier and password. Other authentication methods may also be utilized, including multi-factor authentication. This may include biometrics including fingerprint or retinal scans. The user can also request creation of an account or register his or her device(s). Further, in another example, the system can grant access, through the web-based interface, to certain owner-selected folders or documents based on a response to pre-selected questions if not accessing such web-based interface with a pre-registered device, and/or a verifying response not through a web-based interface, but to a message sent to a preselected device, including a cell phone or other communication device. Once the user is logged on after authentication, the user is provided a web-based user interface through which the user can interact with the document management system, and upload and manage documents and document information (e.g., metadata).

By way of exemplary explanation, authentication is a means of proving that a person corresponds to a computer entity, e.g., an account customer. This can be proved by one or more of the following: something the person knows (e.g., a password), something the person has (e.g., a smart phone or a secure token), or some characteristic or trait of the person is (e.g., a physical, behavior or other biometrics such as unique finger print, voice patterns or retina patterns), or something a person does (e.g., their unique handwriting style or vocal patterns) or a combination thereof. The document management system can implement a single factor or multi-factor authentication scheme. For example, the system can implement a single factor authentication scheme through the use of a password. Multi-factor authentication schemes are stronger, because the attacker must be able to recover or forge all elements of the authentication, e.g., the knowledge of a password and biometric details of the target's fingerprints.

Figure 7:
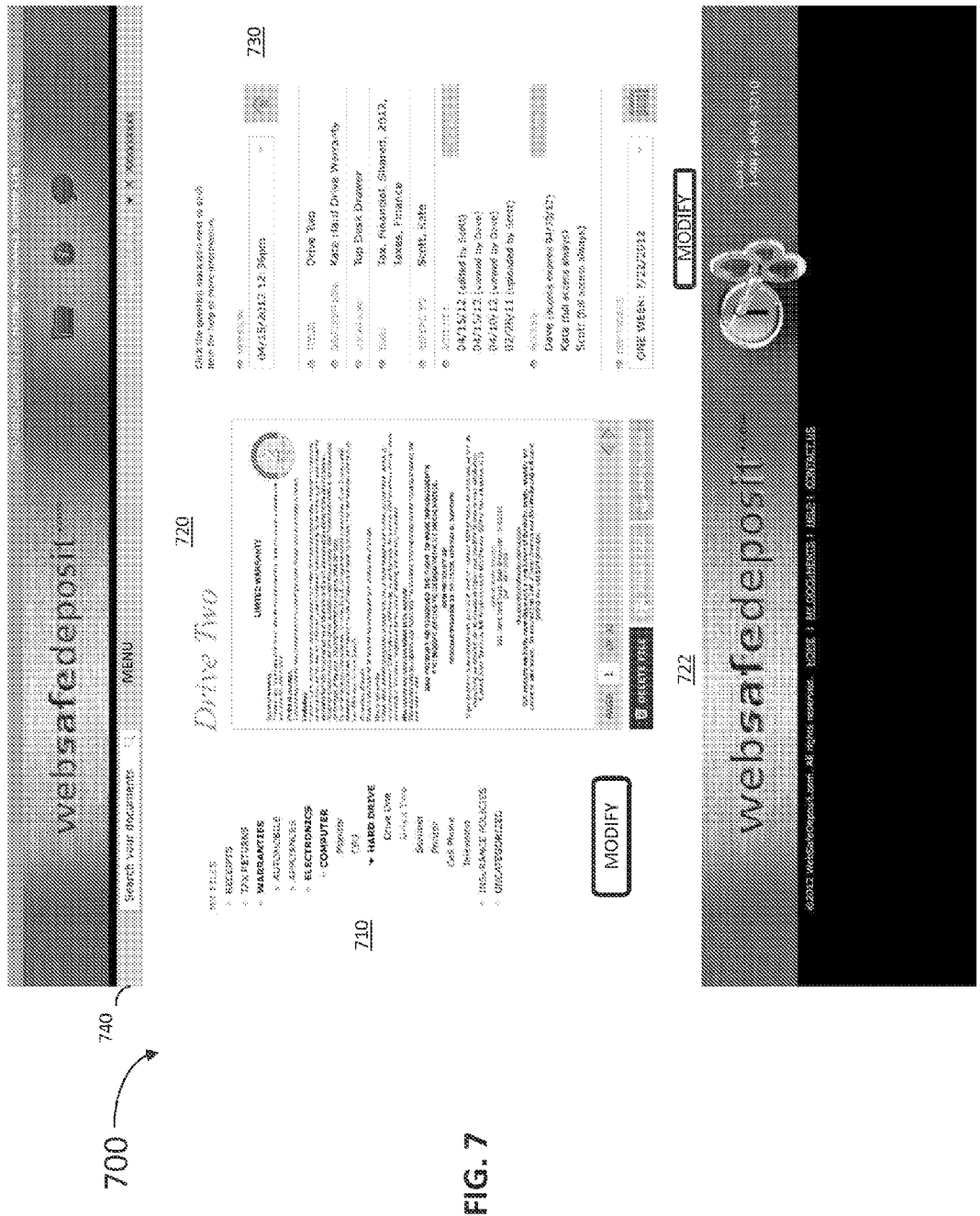
FIG. 7 is a screenshot of an exemplary interface, such as a web page or web site, through which a user accesses or manages electronic document(s) and associated document information in accordance with a disclosed embodiment.

FIG. 7 is an exemplary screenshot a layout 700 of a web page of a web site for a document management system (or an account registered with such system) in accordance with a disclosed embodiment. In this embodiment, the user (or account holder) is a hypothetical user X.Xxxxxxxxx and a hypothetical sponsor is MYERS INSURANCE GROUP LTD. As shown in this figure, various types of content are made available to the user.

At or around section 710, there are a number of folders arranged under MY FILES. The folders include RECEIPTS, TAX RETURNS, WARRANTIES, INSURANCE POLICIES AND UNCATEGORIZED. The Folders can be expanded or collapsed to show the subset of documents or sub-folders in a folder. For example, the TAX RETURN folder can include the documents (not shown) 2007 Tax Return, 2008 Tax Return, 2009 Tax Return, 2010 Tax Return, 2011 Tax Return and 2012 Tax Return. Further, as shown, the WARRANTIES folder includes sub-folders AUTOMOBILE, APPLIANCES and ELECTRONICS. The COMPUTER sub-folder also contains a sub-folder HARD DRIVE, which contains the documents Drive One and Drive Two. Depending on the level of authority, the user can select a folder(s) or document(s) and implement certain functions, such as to modify or remove them. Other operations, as disclosed herein, can also be performed on a document or folder.

The layout 700 includes a section 720 for displaying a document. In this example, the document "Drive Two" from the HARD DRIVE folder was selected for display. The user can navigate through the folders and select a document for display. A search field can also be provided to allow a user to implement a Boolean or text based search of the metadata attached to the document. In an alternative embodiment, the documents can be converted to a text searchable form (e.g., such as using OCR (Optical Character Recognition), and a text search can implemented to search the documents by their content. As shown in section 722, graphical commands are provided to allow an authorized user to print (PRINT DOC) or download a document (DOWNLOAD). A graphical command DELETE FILE (also shown in section 722) is provided to allow an authorized user to delete the currently viewed document. Depending on the level of authority, the user can modify any folder, folder information (e.g., folder name), folder hierarchy and folder content, including the documents contained therein.

The layout 700 also includes a section 730 for displaying document information, e.g., metadata, for a selected document. In this example, the document information includes VERSION, TITLE, DESCRIPTION, LOCATION, TAGS, REFERS TO, ACTIVITY, ACCESS and REMINDERS. The VERSION field is the current version of the selected document (e.g., Apr. 15, 2012 12:36 pm). Information on prior document versions can be accessed as well, such as through a drop down list identifying other versions. The TITLE field is the title of the document. The DESCRIPTION field is a description of the document. The LOCATION field is the location of the physical document. The TAGS field are additional information concerning the document, in this case, Tax, Financial, Shared, 2012, Taxes, Finances. The information in the TAGS field can be used to further categorize a document, such as for searching purposes or placement in certain folders. The REFERS To field identifies persons referred to in the document, e.g., Scott and Kate. The ACTIVITY field provides an audit trail of activities concerning the selected document, e.g., when, by whom, and what was done in relation to the document. For example, the document was edited by Scott on Apr. 15, 2012. The ACCESS field identifies the entities or parties that have access to the selected document and their level of access authority. The REMINDERS field provides a pre-selected reminder or notification data, which is modifiable through selection of a date on a calendar graphical input. For example, a calendar can be displayed in a modal overlay of the web page view enabling the user to select a date from the displayed calendar The lists of information in certain document information fields, shown in section 730, can be expanded or contracted to show some or all of the information depending on the size of the listing. Depending on the level of authority, the user can select a document information field or items in a particular field and implement certain functions, such as to input, modify or remove information. Other operations, as disclosed herein, can also be performed on document information.

Various user input techniques can be offered to the user to implement commands and functions, such as point and click, text box, drop down list, drop down box, drag and drop, graphical button (e.g., MODIFY and DELETE FILE buttons), graphical boxes with check boxes, graphical buttons, text box and so forth. Further, the layout may provide for a command or tool bar(s) in section 740, which can include a MENU of command options (when selected), a search box for conducting a search of the site or search of documents, or other commands as desired.

The webpage shown in FIG. 7 is provided as an example. Thus, the various content, content layout and input methods of a document management user interface screen or page can be configured as desired. For example, when a sponsor is used, the sponsor may place its banner on the site or page. The content may also be placed separately on different pages, and arranged in a different location or manner.

B. Exemplary Processes

Various exemplary processes are described below with reference to FIGS. 2 through 6, and can be implemented in the system environment shown in FIG. 1.

Figure 2:
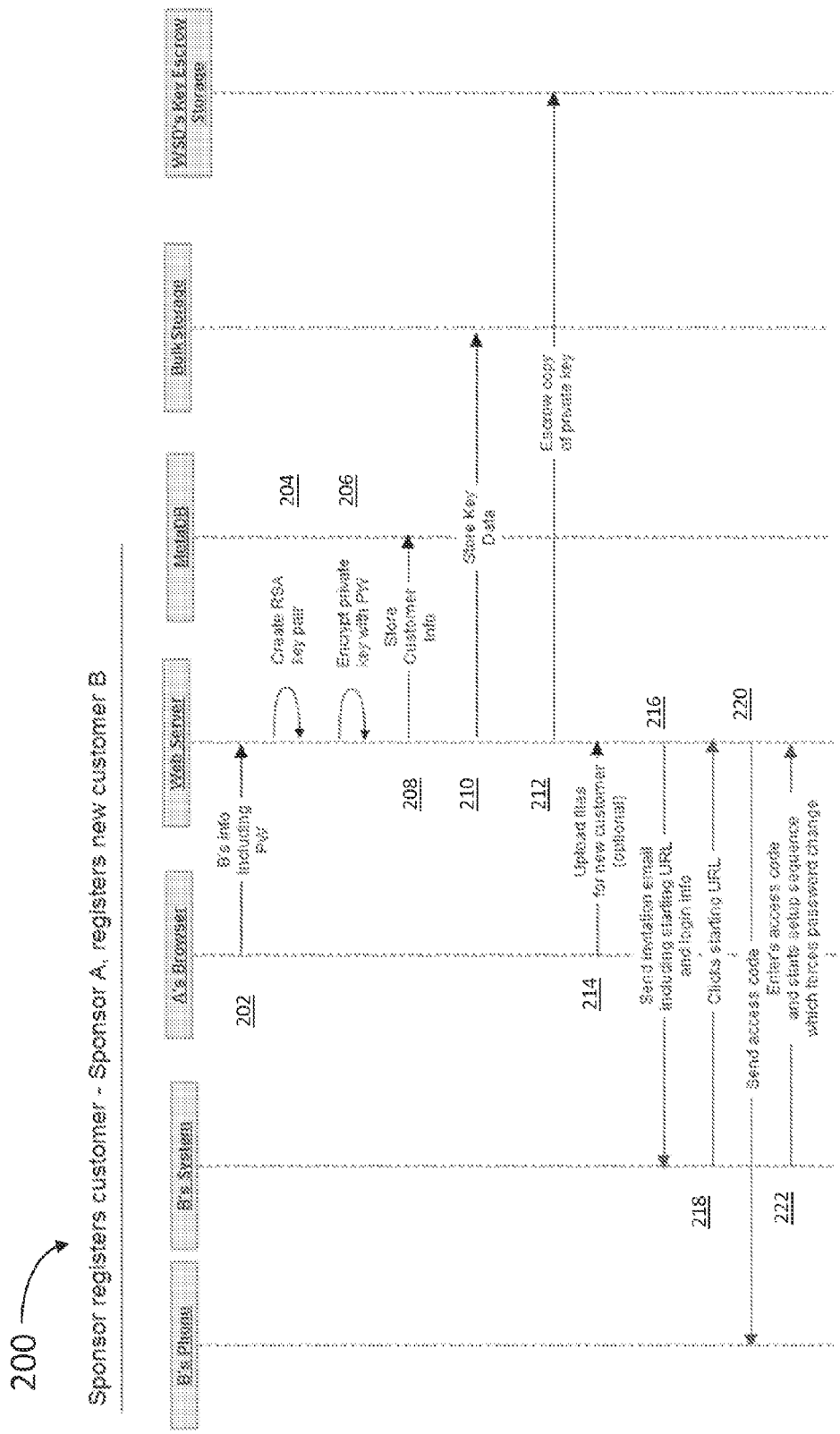
FIG. 2 is a sequence diagram of an exemplary registration process in accordance with a disclosed embodiment.

FIG. 2 is sequence diagram of an exemplary process 200 for registering a new customer (or user) with the document management system in accordance with a disclosed embodiment. In this example, there is a sponsor A that registers a new customer B.

At step 202, the process 200 begins with the web server receiving from the sponsor A information of a new customer B including a password (PW). The new customer information can include name, address, email or other contact information.

At step 204, when a customer is created, an asymmetric key pair is created for that customer. In this example, the asymmetric key pair is a RSA key pair. The public portion of the key can be stored in the clear at step 210. The private portion of the key is stored after it has been encrypted with the customer's password at steps 206 and 210. The customer information is stored at step 208. At step 2012, a copy of the private key is escrowed in a key escrow storage.

At step 214, electronic files can be uploaded for the new customer B.

After the initial customer information has been stored at step 208, the new customer is sent an invitation email (at step 216) that includes a URL, his login name, and an initial password. In this example, initial access to the user interface (UI) is limited to a welcome page, identifying the owner or operator of the document management system, system manager or assignee promotional material and an icon containing a hyperlink to a log in or sign in page, which is also part of the UI. When the customer B first visits the initial page at step 218 (e.g., by clicking the URL), the web server sends an access code to the customer B's device (e.g., a mobile phone) at step 220. By sending additional information over a second channel, it reduces the likelihood that an attacker has grabbed the invitation and is trying to gain unauthorized access.

At step 222, the customer B can enter the access code, which starts the setup sequence. As part of this sequence, the customer may be required to change the password. Once the customer B has changed the password and entered the necessary setup information, the customer is marked as a fully registered user and is able to make full use of the system.

The system can be configured to allow different levels of authentication, such as single or multi-factor authentication. At a minimum, the user must be authenticated, such as using a password. The system may allow for higher degrees of authentication such as two factor authentication via secure tokens or smart phone communication.

Figure 3:
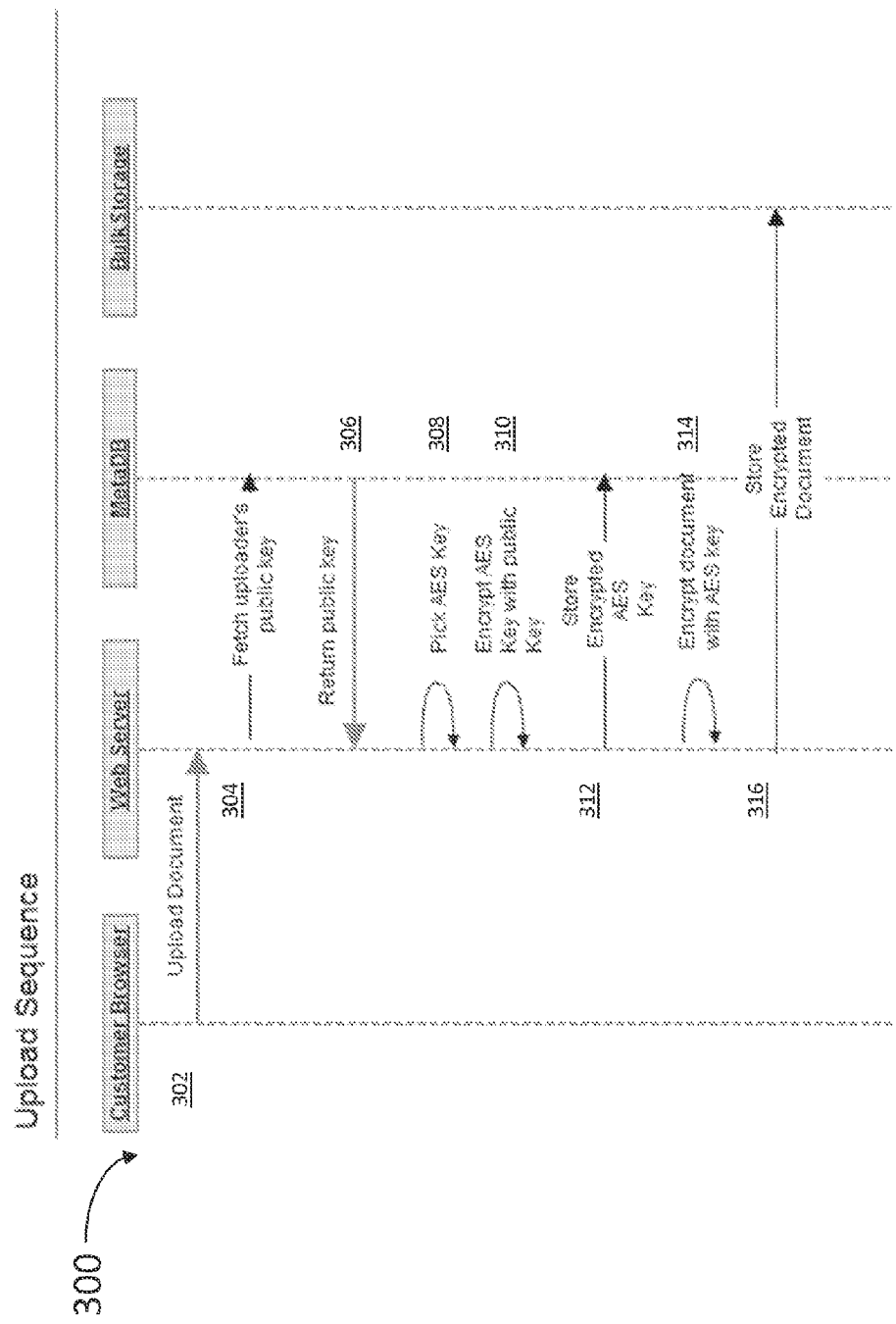
FIG. 3 is a sequence diagram of an exemplary upload process of an electronic document in accordance with a disclosed embodiment.

FIG. 3 is a sequence diagram of an exemplary process 300 by which a user is able to add a new document to the document management system. The document can contain confidential or sensitive information. To provide additional security, the document is encrypted before it is stored in a storage database, such as a bulk storage data store.

At step 302, an electronic document is uploaded to (or received by) the system through the web server. At steps 304 and 306, the web server fetches and receives the uploader's public key from the metadata storage database. At step 308, an AES key is selected or picked, and the AES key is encrypted with the public key at step 310. The encrypted AES key is stored in the metadata storage database at step 312.

At step 314, the web server encrypts the document with the AES key. Thereafter, in step 316, the web server stores the encrypted document in the bulk storage.

In this example, each document is encrypted using a symmetric algorithm such as Advanced Encryption Standard (AES). Also, the symmetric key is made available to retrieve the data, but it should only be available to the appropriately authorized users. The system uses the uploader's public key to encrypt the document's symmetric key. However, if the user is uploading a document for another user, the system uses the public key of the target user to encrypt the symmetric key. If multiple people have access to the document, the key can be encrypted and stored multiple times using the public keys of every allowed reader.

Figure 4:
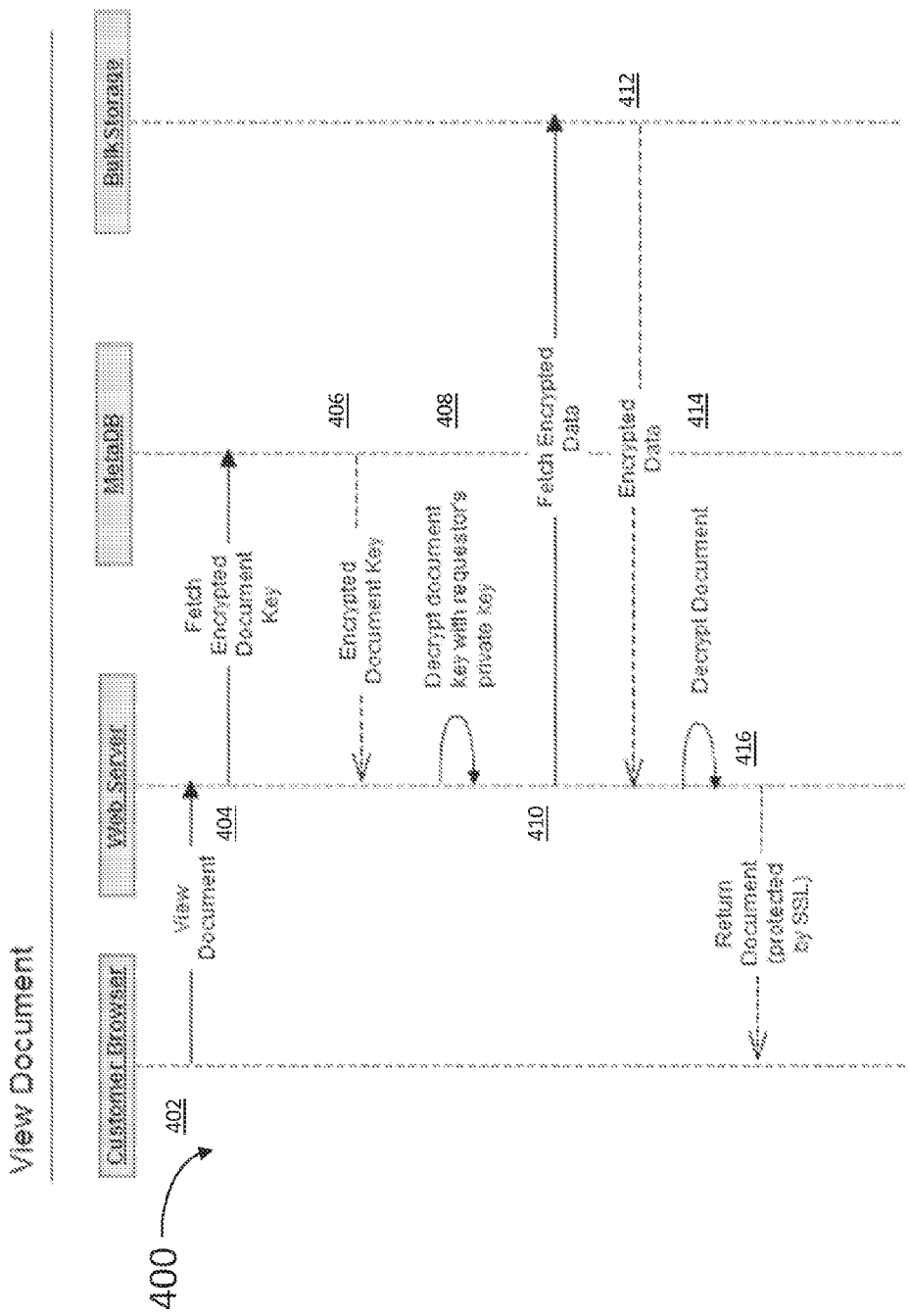
FIG. 4 is a sequence diagram of an exemplary process for viewing an electronic document in accordance with a disclosed embodiment.

FIG. 4 is a sequence diagram of an exemplary process 400 by which a document management system enables retrieval of a document for an authorized user.

At step 402, the user requests a particular document. At steps 404 and 406, the web server fetches and retrieves the user's encrypted key for that document. Then, in step 408, the web server decrypts the document key using the user's private key. The user's private key is retrieved and decrypted when the user initially logs into the system. Once the document key is decrypted, it can be used to decrypt the encrypted document.

At steps 410 and 412, the web server fetches and receives encrypted data of the document. At step 414, the web server decrypts the encrypted data to decrypt the document. At step 416, the web server delivers the document to the user. In this example, the document is protected by SSL (Secure Sockets Layer) encryption and integrity controls when it is delivered from the web server to the user's device.

Figure 5:
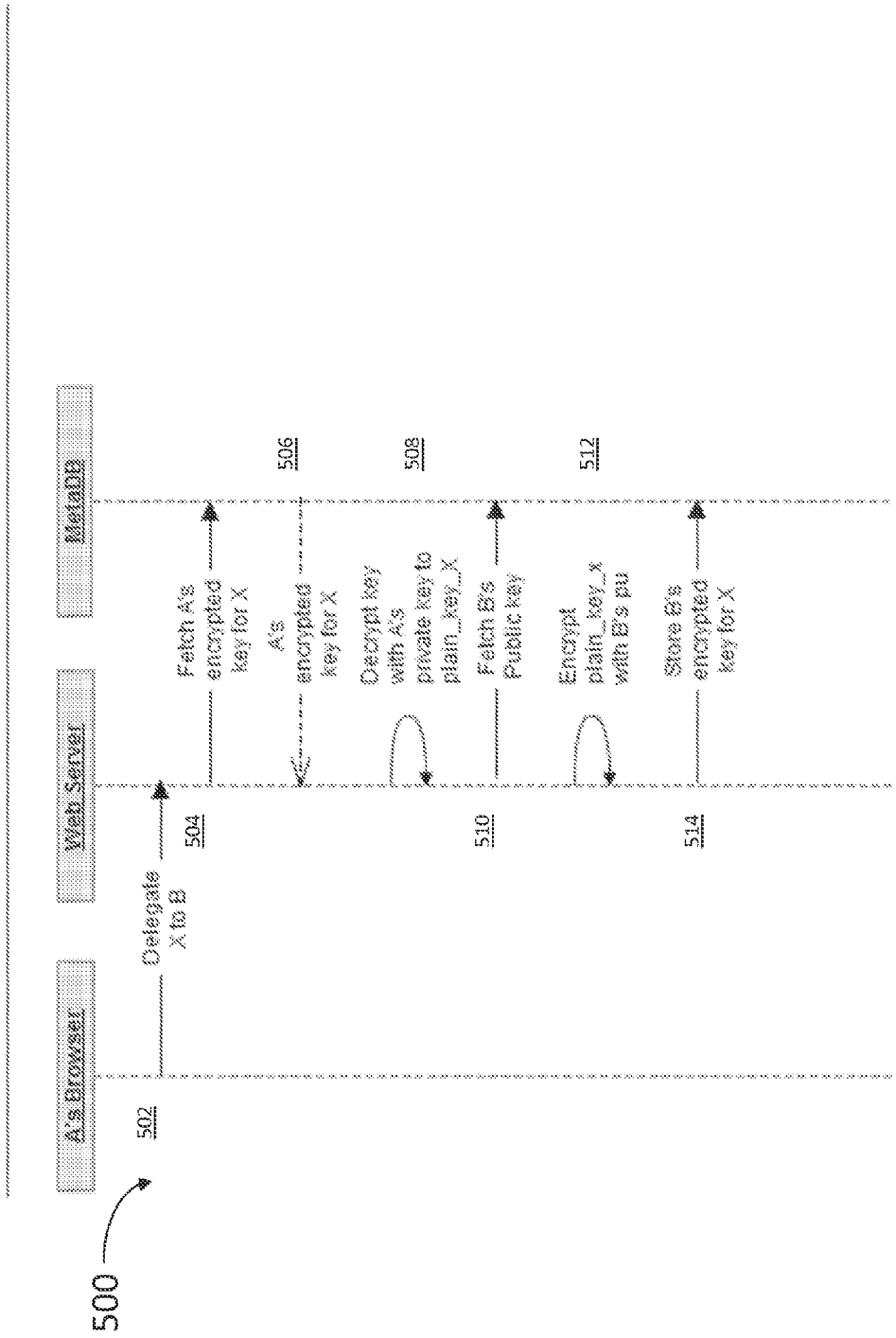
FIG. 5 is a sequence diagram of an exemplary process for delegating to another party access rights to an electronic document in accordance with a disclosed embodiment.

The system also provides a means to share access with other users through delegation. FIG. 5 is a sequence diagram of an exemplary process 500 implemented by the document management system to set up such a sharing relationship on a document(s). In this example, user A wants to give user B access to a document X.

At step 502, user A submits a request to the web server to have document X delegated to another user, in this case user B. At steps 504 and 506, the web server fetches and retrieves user A's encrypted copy of the document's key from the metadata storage database. At step 508, the web server decrypts the key using user A's private key.

At step 510, the web server fetches and retrieves user B's public key from the metadata storage database. At step 512, the web server can then re-encrypt the document's key using B's public key. Thereafter, in step 514, the web server stores the newly encrypted document key for later use by user B.

Figure 6:
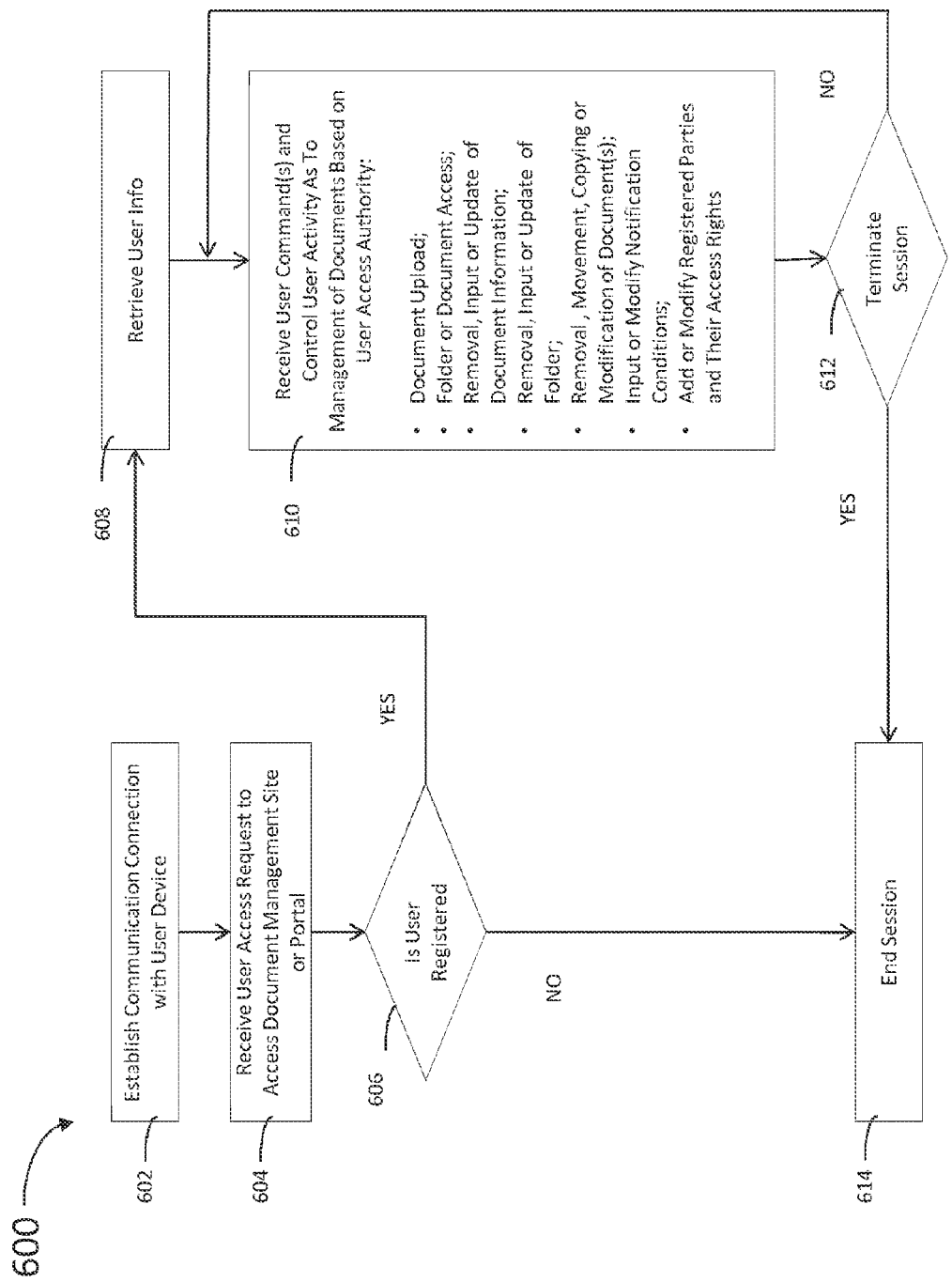
FIG. 6 is a flow diagram of an exemplary process by which a document management system interacts with a user through the user's device in accordance with a disclosed embodiment.

FIG. 6 is a flow diagram of an exemplary process 600 by which the document management system, such as shown in FIG. 1, interacts with a user through the user's device.

At step 602, a communication connection is established between the document management system and the user device. For example, the user initiates contact with the document management website or portal through a browser (e.g., the home page of the website) or application program. At this point, the user can be prompted to enter or can enter access information, such as an account identifier and a password.

At step 604, the system receives user access request along with an account identifier and password, and determines in step 606 whether the user (or the user's device(s)) is registered or authorized to access the document management system. Other authentication techniques can also be employed. If the user is not registered or authorized, the session is terminated at step 614. Otherwise, if the user is registered or authorized, the system then proceeds to step 608 and retrieves user information (e.g., user profile). The user information can include the account holder's name and contact information, the user's authority level (e.g., sponsor, principal, delegate, etc.) and access rights, user's key(s) along with any other user related information in managing the user's documents or documents accessible by the user. Based on the retrieved user info, the system can generate, control and customize a graphical user interface, web pages, content and commands available to the user. This may include the layout of folders, document identifiers in each folder, documents and document information, and user commands.

Thereafter, in step 610, the system can receive user command(s) and control user activities as to management of documents based on user access authority. The activities can include Document Upload; Folder or Document Access; Removal, Input or Update of Document Information; Removal, Input or Update of Folder; Removal, Movement, Copying, Printing or Modification of Document(s); Input or Modify Notification Conditions; Add or Modify Registered Parties and Their Access Rights. The activities may also include navigating through webpages, screens or options made available to the user. The user commands may be implemented through various graphical inputs, such as a menu of functions, graphical buttons, drop down menus, drop down lists, text box, drag and drop and so forth. The above-described user commands and activities are provided simply as examples. Other user commands and activities described in this disclosure may also be implemented.

At step 612, the system determines whether the user has requested termination of the session. If not, the system returns to step 610. Otherwise, if termination is requested, then the system terminates the session with the user.

C. Additional Exemplary Implementations

1. Exemplary Organization Scheme

The method and system disclosed herein can utilize a methodology for organizing electronic (or digital) documents into subsets or categories, such as through the use of folders, to enhance the user experience and to facilitate ease of use and searching. In an additional disclosed embodiment, this method of folder organization can permit one document to be stored in multiple folders.

For example, a digital image of an income tax return for a child of the user may be stored under both the income tax folder used by the family and in a folder dedicated to the child's financial statements. The document is accessible for viewing, downloading or printing by accessing any folder to which it is assigned. It may be deleted from one folder, but a deletion from one folder does not automatically provide for deletion from the other folder(s) in which it is located.

A user can be provided various tools or commands or actions to organize and maintain electronic documents and information associated therewith. These may include the operations or processes to delete documents from one or more folders; to add documents to one or more folders; to designate special folders for specific use (e.g., holding bin); to create, name, modify and select folders; and to add, delete or rename folders. These and other capabilities are described below and throughout this disclosure.

For example, as to a deletion operation, a document can be deleted from one or more folders. In a further exemplary aspect, deletion of a document (assigned to more than one folder) from one folder can result in the deletion of the document from all other folders to which it is assigned. In this situation, a warning can be provided to the user advising of the potential deletion of the document in all relevant folders as a precursor to implementing the deletion operation in the system. Also, the user can be provided with the option instead of simply deleting the document in a particular folder.

Further, a special-purpose folder, named "holding bin" or other name, can be utilized to facilitate the uploading of documents into a storage database. For example, a document is dragged and dropped into this folder with the intention that the user can add or associate metadata to these documents at a later date, or assign these document to a permanent folder(s) for organizational and retrieval purposes.

The document management system disclosed herein can also employ functionality to allow the user to create, name, modify and select folders for organizational purposes. In an exemplary embodiment, the user, after launching the browser on his computer or other device, logs into the site employing the method and system disclosed herein and navigates to a Set up Page. By way of example, the Set up Page initially lists names of folders, such as "Tax Returns", "Insurance Policies", "Life Insurance" and "Receipts" with a check box next to each folder. In addition, directly underneath the folder names are blank fields that the user can select and type in folder names that do not appear above. Upon checking of the box next to each folder, the user activates the functionality that permits each such folder name to be displayed in appropriate pages within the site and further permits documents to be associated with, or placed virtually within, such folders.

In addition, the user can be provided the capability to add, delete or rename folders at any time through the functionality manifested on the Set up Page.

2. Document Information/Metadata

As described above, an electronic document can have document information associated therewith, such as metadata. The document management method and system disclosed herein can provide for automatic and/or manual creation of metadata or selected categories of metadata for each document, and provide for modification and update anytime thereafter. The metadata can contain useful document information, which is used by the system to provide various functions, such as: to provide a user with information concerning the documents (e.g., document owner, location of physical document, contact information, audit trail, access rights and rules); to organize the documents into one or more particular folders; to name and create folders; to define access rights and rules for the handling of the document (including notifications to the user or other parties); and so forth.

For example, in a disclosed embodiment, the system can provide for quick attachment of metadata by a user to a chosen uploaded document. This method may involve a series of drop down boxes that present the user with a choice of two (2) or more values for such metadata. In an exemplary embodiment, when attempting to attach information identifying the location of the original paper document to the uploaded document, the user can, for example, simply left click on an icon or word so that a drop down box of choices appears. Holding the left click down, the user can move the cursor over the desired choice and release the mouse button to choose such a value. In another embodiment, upon clicking over a metadata item, a modal display of the available metadata choices for the category clicked appears over a darkened version of the web page and the user selects by checking one of more of the choices, and/or adds another choice in freeform text and checks such newly-entered text, and then clicks save wherein the modal disappears, the formerly darkened webpage is now at normal visibility with the changes just made displayed. Such values could be for the following information: a location where original paper document is stored, names of third parties with access to the document and the type of access granted along with the expiration date of such access, the name of the person to whom the document is associated, date(s) when an email reminder concerning the document is to be sent to the user, and one or more additional tags in text format to assist in organizations, such as, "receipt", "warranty", "appliance".

Further, the above metadata can exist as fields in a metadata database and is stored in an encrypted form. The user can populate the fields in the metadata database via entry into fields displayed on the "Set up Page" of the user interface. The term "Set up Page" is utilized for convenience in this description and others throughout this disclosure, and is not intended to be limiting in any way. Further, it is not intended to be limited to one page or display screen of a website of the document management method and system.

In another disclosed embodiment, one of the values in the drop down list is blank, enabling the users to input such value directly into the drop down list without the need for input on the "Set up Page". In yet another disclosed embodiment, such direct input into the drop down list automatically updates the drop down list for all future transactions utilizing such list, and the newly-entered value will appear as if it had been entered on the "Set up Page".

In addition, the user may delete items from any drop down list through access to the "Set up Page". Such action will revise the drop down list available when uploading a document or modifying the metadata on any document. In one exemplary implementation, any values deleted from such drop down list will not delete such metadata from previously uploaded documents.

3. Exemplary Access Control

The document management method and system disclosed herein may also provide for access control over the handling of sensitive documents. Access control can be defined by access rules that may dictate the level of authority an entity or party has with regard to actions relating to a document(s) or a category of documents. A plurality of access levels may be predefined with certain access authority, or access authority can be customized on an item-by-item (e.g., view, delete, modify, upload, receive/send notifications) for each document depending on the particular document and the entity or party involved. This can be accomplished through a user interface.

In one example, a hierarchy of third parties with varying levels of access to the documents is included and can be managed by the user. The primary user or "principal" can be given complete control of the upload, deletion, assignment to folders and attachment of all metadata to all documents. This includes the delegation of rights to third parties. An exemplary process by which a user delegates document access to another party was previously described above with reference to FIG. 5. The names assigned to various parties with access to and control over any document may be modified at any time.

Further, in an exemplary embodiment, the principal may assign authorities to more than one party, identified as "co-principals". For example, one co-principal is a spouse and another co-principal is a child. Co-principals are assigned unique names and passwords, subject to modification by such co-principals. Co-principals have all the authority of a principal with the exception of being able to add or remove other co-principals. A principal may terminate the authority of a co-principal, but a co-principal may not terminate the authority or ownership of a principal. Upon termination of a co-principal's authority, the system notifies such co-principal, for example, through an email sent to the email address provided by such co-principal or through other communication channels.

The principal and any co-principal may grant access to a third party known as a "first delegate". A first delegate has all rights of a principal, except for the privilege of naming co-principals, terminating the account, or deleting documents. The first delegate is assigned a unique name and password, subject to modification by such first delegate. Upon termination of a first delegate's authority, the system notifies the first delegate for example, through an email sent to the email address provided by such first delegate or through other communication channels.

A first delegate, co-principal or principal may assign the status of "delegate" to any third party. Authority granted to such party as delegate is limited to the ability to view and download any document to which such authority is granted. Authority may also be granted at a folder level. Authority of a delegate may be terminated by the principal, a co-principal or the first delegate at any time and such authority can be set to terminate at one year, or at some other time as selected or defined, after it is initially granted or renewed unless renewed by a principal, co-principal or first delegate. The delegate is assigned a unique name and password, subject to modification by such delegate. No notice is given to a delegate of any termination of authority.

A first delegate, co-principal or principal may grant access to the account via a status known as "emergency delegate". More than one emergency delegate can be appointed. Each emergency delegate is assigned a unique name and password that can be modified by such emergency delegate at any time. Emergency delegates are granted view only authority.

Such authority does not expire unless revoked by a principal, co-principal or third party. No notice is given to an emergency delegate of any termination of authority.

The emergency delegate is not advised of such appointment until such time as a predetermined event (or condition) occurs. This event may include the failure of a principal, co-principal or first delegate to respond to an email generated by the system within a predetermined period of time or other conditions or events which can be defined by a user or system.

The emergency delegate is granted access upon receipt by the manager of owner of the site of a document type previously identified by instructions predetermined and communicated to the manager or owner of the site by a principal, co-principal or first delegate. Such document may be, but is not limited to a death certificate, properly executed power of attorney, or court order.

A sponsor may upload, download or view any document or folder that is initially selected by such sponsor. One party may be the sponsor for numerous principals. Each sponsor has a unique name and password that the sponsor may modify at any time.

In a disclosed embodiment, a sponsor is a financial, legal or other professional and uploads documents for which he or she has some responsibility to a folder or folders of a principal. Upon upload, the system automatically advises the principal and if selected, the co-principal and first delegate of such upload, such as through email or other communication channel.

The sponsor has authority for a set period of time to delete the documents uploaded by the sponsor. Upon expiration of that time, the sponsor may not delete any documents uploaded.

The sponsor's authority may be revoked by any principal, co-principal or first delegate at any time. Upon revocation, such sponsor is notified of the revocation, such as through email generated by the system or other communication channel. Upon revocation, the principal is advised, for example, through a system-generated email of the revocation or through other communication channels (e.g., system-generated call), and credit card information is solicited for renewal of the service at anniversary date.

A principal, co-principal or first delegate may appoint another party, such as a financial or legal professional as an "authorized professional" for the purpose of uploading, downloading or viewing documents. The authority granted to the authorized professional may be terminated at any time by a principal, co-principal or first delegate, and can be set to automatically terminate on the one year anniversary date or its last renewal, or at some other time as selected or defined, unless reauthorized by such principal, co-principal or first delegate. Upon termination, the system advises the authorized professional of termination, for example, through a system-generated email or through other communication channels (e.g., system-generated call).

The authority granted to upload, download or view any document may be granted to any party at the document level, the folder level, or at the folder level with chosen documents excepted (or included).

The assignment or termination of any status such as co-principal, first delegate, delegate, emergency delegate, authorized professional or sponsor is managed, for example, on a "Set up Page" or other user interface. The assignment or termination can be managed through the creation of a drop down list for quick assignment of authorities when any document is uploaded and assigned to a folder, or when viewed. Termination dates, if applicable, are defaulted to one year from creation of such authority, or other time as selected, with the user having the option to select an earlier date.

4. Notification

In managing documents, there may be times when a user or other party is notified in relations to a particular document(s). Such notification can be implemented under certain conditions or events that may be defined beforehand, such as in a field(s) (or item(s)) in the metadata associated with a document.

For example, the user may attach as part of the metadata assigned to a document, instructions to the system to send an email to the user at a predetermined date, such email to constitute, for example, a reminder concerning the document. In a disclosed embodiment, a reminder may be a notification that a warranty on a purchased item, as evidenced by an image of a receipt uploaded to the system, is about to expire.

When a document is uploaded or viewed later at any time, a user with proper authority may attach to the document via a drop down list, a date for notification in the future to be sent to the user, such dates being identified as either a time selected from a pop up calendar, or dates identified as being one week, two weeks, one month, one year, and so forth from the date of selection of the notice. The selection can be displayed in a dropdown menu having a time period to be selected by the user, including two weeks, one month, two months, three months, six months, one year, or other time as determined. The system generates and transmits a notice to s selected contact address of a device or a person or entity on a date on which the selected time period expires, and if no response to the notice is received by the system after expiration of the selected time period, a message is transmitted to a pre-selected device of another person or entity. The contact address can be an address for communicating an email, a text message, a video message (e.g., a video call or file), audio message (e.g., a telephone call or audio message file) or other electronic or non-electronic communication message.

In a further disclosed embodiment, instructions or messages are delivered to a designated third party in the event of fulfillment of conditions preset by an authorized user. Blank forms and free form text files are used to assist an authorized user in the creation of such instructions or messages. For example, a user can complete a form identifying funeral instructions. These instructions are either immediately emailed to a third party and/or an emergency delegate upon creation, or such party is immediately advised of their existence via an email or other communication means discussed herein (e.g., text message, a telephone call message or a video call message) and given a unique name and password enabling access to the appropriate section of the website.

Furthermore, depending on the user preferences, such instructions can be communicated upon fulfillment of a preset condition, such as the user's failure to respond to an email message, or presentation of a death certificate or other document.

Also, depending on user preferences, instructions can be prepared by the user in paper form, signed and notarized if necessary and the third party or emergency delegate is immediately notified via email of the location of the instructions or the location of the instructions can be communicated upon fulfillment of a preset condition, such as the user's failure to respond to an email message, presentation of a death certificate or other document.

Although communications are implemented using email in various disclosed embodiments through this disclosure, other forms of communication may also be used to convey the contents of a message and to request a response from a notified party. Other examples can include a phone call or text message or mail or courier.

5. Document Upload and Removal

The method and system herein can employ various techniques to enable and facilitate upload or removal of documents. These may include upload through a website or page, through email or other electronic medium by which data can be transferred. Further, to enhance the user experience, various user interfaces and input control schemes can be utilized including "drag and drop" technology.

In one example, "drag and drop" technology can be used to facilitate the uploading of documents into the user's portion of the storage database. For instance, using a computer or the like, a user logs into a website to access the document management system, and navigates to a document management screen or document upload screen. The user opens a folder on his computer that contains the document he wishes to upload, and locates the images of both the folder and the website page on his monitor so that both are simultaneously visible. The user moves his cursor over the file to be uploaded, left clicks his mouse and continues to depress the left button, moves the cursor, dragging the document so that its file name appears over the folder or upload bin on the website and releases the left button. The file, or document, is then encrypted and transmitted to the storage database.

In another disclosed example, the user can upload a document through an application (or app) specifically designed for a smart phone or similar device. For example, the user takes a picture of the document to be uploaded. Through the device application, the user can send the image of the document in encrypted form, directly or indirectly, to the holding bin or a designated repository for the user in order to complete the upload process. Upon receipt by the storage database, the uploaded document is assigned a unique identifier for later retrieval, viewing or display, deletion, or association with metadata. The document name as indicated in the user's computer memory (e.g., a hard drive) is the default name given to the document.

In yet another disclosed embodiment, the user uses the right mouse button if such user usually utilizes such right mouse button, as is common with some left-handed computer users.

By way of further example, a sponsor or authorized professional may have access to more than one principal's account. The sponsor or authorized professional can utilize the aforementioned "drag and drop" technique to upload documents into a principal's account, with the modification of the method in such a manner that the sponsor or authorized professional first opens his or her view of the principal's documents prior to uploading.

Once uploaded, the document management method and system disclosed herein may provide for various techniques to move documents between folders, to remove or delete documents from a folder(s), or to add documents to a folder(s) or additional folders, or to implement a combination thereof.

For example, in an exemplary embodiment, the user identifies the folder where a particular document is located, and through one or more methods, such as left click, cursor rollover, or other method as described above (or not described above), is able to drag the document and drop it into another folder displayed on the appropriate page of the website provided through the system.

Upon placement into the new folder, a message appears on the web page, inquiring as to whether the user desires the document to be removed from the original folder or not removed from the original folder and added to the new folder. Upon selection of the appropriate answer, by placing the cursor over the answer selected and depressing and releasing the right or left button on the mouse, the document is moved from the original folder and added to the new folder or added to the new folder without removal from the original folder.

In accordance with a further disclosed embodiment, the system may utilize standard email protocols with the enhancement of integrating the email inbox into the web pages utilized by the system to facilitate the uploading of both email text and header information and attachments into folders as documents for storage, organization and retrieval.

For example, in an exemplary embodiment, by dragging and dropping an icon or title of an attachment into a folder or a holding bin, the attachment is uploaded into the storage database as if it were directly uploaded from the user's memory device (e.g., a hard drive). By dragging and dropping an icon or email description into a folder or a holding bin, the email body is uploaded into the storage database as if it were directly uploaded from the user's memory device. Once within the system, the emails and attachments are under the umbrella of the security provided by the site. Emails and attachments are encrypted within the user's browser and transmitted in an encrypted form to the storage database for storage.

In yet a further disclosed embodiment, the system can include functionality enabling third parties to upload documents directly into a user's folders. For example, a sponsor or authorized professional desires to upload a document such as an insurance policy or tax return to folders of the user. The sponsor or authorized professional has a number of available upload methods, three examples of which are provided as follows.

In one example, to accomplish an upload, the sponsor or authorized professional launches a browser, logs into his or her account offered by the system for sponsors or authorized professionals, and navigates to the page of the client for whom the upload is to be conducted. From a memory device (e.g., a hard drive or flash drive), the user then drags and drops the appropriate document into the client's appropriate folder or holding bin. Thereafter, an email generated by the system is sent to the user advising him or her of the upload. By using this exemplary approach, the document is encrypted within the sponsor's or authorized professional's browser and is transmitted in an encrypted form.

In another example, the sponsor, authorized professional, or other party emails the document to be uploaded as an attachment to an email addressed to the user's email address for an email account that is embedded within the web pages utilized or designated through the document management system. In this disclosed embodiment, the email and the attachment may or may not be encrypted prior to transmission to the user's email account. Upon receipt, the user may drag and drop the email and attachment, as described above.

In a further example, the user is permitted to launch a browser on the computer of the party with documents to upload, logs into the user's account and drag and drops or authorizes the sponsor, authorized professional or other party to drag and drop the document directly into the folders or holding bin of the user. The document is encrypted in the browser. Thus, the transmission of the document to a storage database of the system is completed in an encrypted state. Once completed, the user can log off from his or her account.

In another disclosed embodiment, the user physically brings paper documents to a sponsor or authorized professional's office and requests that such party scan such documents into his computer and then initiates secure upload as described above.

In the method and system disclosed herein, a user may delete a document from a folder or all folders in which it is placed. For example, the user selects the name of the document from a list of the documents in each folder, and drags and drops (as described above) the document over an icon depicting a trash bin or over an area of the webpage that indicates a trash bin, recycle bin, or other similar functionality and releases the document over such icon or area of the web page. The document is then deleted. Alternatively, such document is not deleted, but placed in a trash folder, and will not be deleted until such time as the folder is emptied through standard methods utilized to delete documents. The trash bin or similar folder can be configured to automatically empty all documents thirty (30) days or at some other time as selected or defined after placement of the document into such folder.

Further, other user input implementations can be used in the selection and deletion of documents from one or more of the folders. For example, in another disclosed embodiment, a selected document can be deleted by right or left clicking on the document name and moving the cursor to a drop down list of functions that include delete, move to trash or other similar function.

6. View, Set and Update Metadata

As described above, the system can maintain document information for each document. The document information can be maintained as metadata that is linked or associated with a document. As will be discussed below, the system provides a user with the ability to view, input, set and update metadata associated with or linked to a document.

In one example, the user can attach user-generated metadata to a document immediately after upload and assignment to a folder. A reduced-sized image of the first page of the document is displayed on a page of the document management site and also on such page is a section devoted to the assignment and display of metadata. The user moves the cursor to the first item of metadata, displayed in text form or via an icon, and named "location of original" or other name as appropriate, right or left clicks as appropriate, continues to depress such left of right button, and a drop down list of the metadata choices for that particular metadata description, input by the user on the Set up Page appears. Keeping the button depressed, the user moves the cursor to the selection and releases the button, thereby choosing such metadata.

In another disclosed embodiment, the user depresses the left or right button, as appropriate, on the mouse and the drop down list of metadata appears. The user does not continue to depress the button, but moves the cursor over the selected metadata description and depresses the left or right button as appropriate once to select the metadata description.

In a further disclosed embodiment, the user moves the cursor over the metadata item description and a display of available choices from a drop down list appear with the cursor roll over. The user moves the cursor within the drop down list area and right or left clicks, as appropriate, the selected choice.

The user can repeat the above-described activities until all such metadata descriptions for which drop down lists are available are chosen.

In another disclosed embodiment, the user selects only some of the metadata descriptions for which drop down lists are available and completes the upload of the document without utilizing all the metadata fields.

Upon full or partial completion of the metadata assignments, the user moves the cursor to an icon or word on the web page to indicate that the user has completed assignment of metadata and wishes to permanently store the document in the document management system's storage database.

In an exemplary embodiment, an authorized user can input additional items of metadata, such as free form text, which input field can be configured to appear with either a right click, left click or rollover (as described above).

Any number of metadata fields can be employed to identify information or data associated with a document. By way of example, five exemplary metadata fields that the user may enter and their prime method of entry are provided, as follows:

| Exemplary Metadata Fields | Exemplary Method of Entry |
| --- | --- |
| (1) Location of original paper document, if any | Drop Down Menu |
| (2) Names of third parties who have access to a document or folder, the type of access, and the expiration of such access | Drop Down Menu |
| (3) Tag identifying the person identified with the document | Text or a Drop Down Menu |
| (4) Another tag to assist in future searches of documents | Text or a Drop Down Menu |
| (5) Reminder notice, including text for a short message, date (mm/dd/yyyy) for the date of the notice and for the email of notice recipient | Dropdown list or Text with email form of address verification |

Furthermore, the document management method and system may provide for the attachment and display of system-generated metadata to each document uploaded to the storage database or databases. For example, this metadata includes, but is not limited to, an identity of the party responsible for upload of the document, the date of upload, the dates last viewed and the identity of the party viewing such document.

In an exemplary embodiment, the metadata generated by the system is displayed in the same manner as the metadata attached to the document by the user. In contrast to the user-input metadata, the user cannot modify or delete the system-generated metadata.

7. View Document and Documentation Info

The document management method and system can permit users to view or display stored documents. For example, a user can view stored documents from within a browser without first downloading such documents to a memory device (e.g., the hard drive, flash drive or other storage medium, or the memory of a computer) and then opening the documents in a viewer. This functionality enhances security.

In one example, the user accesses the document management portal. For instance, through a browser, a user logs onto a website for the document management system. The user navigates to a document display webpage, and selects a folder from a list of folders. A list of documents in the selected folder are displayed on a web page. The user then selects a document to be displayed from the list of documents in the folder. For example, the user can place the cursor over a document to be selected and left or right click a mouse input device, as appropriate, to select that document. The selected document is then displayed along with all or selected items of the metadata associated with the document.

In another example, the user navigates to the folder that has the document to be displayed and moves the cursor over a thumbnail image of the document that is displayed next to the document name. The placement of the cursor over the thumbnail generates a larger image of the document. This larger image can be further selected by placing the cursor over any part of the image, and upon a right or left click of the mouse, causing the document to be fully displayed with its associated metadata.

In yet a further example, the user navigates to the folder that has the document to be displayed and moves the cursor over a thumbnail image of the document that is displayed next to the document name. Placing the cursor over the thumbnail, the user right or left clicks the mouse to display a larger image of the document along with the associated metadata.

In another disclosed example, a user selects a folder from a list of folders. With a left or right click (as appropriate), the most recently uploaded document to such folder is displayed, along with two or more documents immediately below. The user may scroll down on the web page to view the other documents in reverse chronological order from the date uploaded.

In a further disclosed embodiment, the view described above is limited to a preselected number of documents. These documents are all displayed in reverse chronological order from the date of upload, with an icon or hypertext link near the bottom of the last document. The icon or hypertext link can be selected, such as by mouse click, to display an additional predetermined number of documents, again in reverse chronological order from the date of upload. In all cases, the metadata associated with each document is displayed near the document displayed.

In addition to displaying documents, the system can include and implement functionality to facilitate the merger of two or more documents into a single document. For example, the user transmits an image of one page of a multi-page document (e.g., a document image taken with a camera included with the smart phone). The smart phone application enables secure transmission of the image directly into the user's holding bin. The user accesses or logs into the document management site, navigates to the holding bin containing the uploaded image(s), and combines all such images or selected images into one multi-page document using an image compiler or the like.

The document management system can also include functionality to facilitate the creation of lists by the user. For example, the user accesses or logs onto the document management site or portal, and navigates to a "List" folder, or folder of a similar name. The documents associated with this folder are intended to be templates to facilitate the creation of lists by the user. By way of example, lists can be of anything desired by the user, such as lists of movies to watch, places to travel, gifts given or received, or items intended to be given to another person or donated to charity.

The documents in such a folder are intended to be modified from time-to-time by the user. The list folder also can contain blank free form text documents that provide the user with the functionality to write instructions, messages for later viewing or reminders. One such use may be instructions to an emergency delegate (as previously described).

Documents associated with the List folder can be viewed as all other documents, with the exception that upon selection of such document, the user may make modifications to such a list. Modifications are not version controlled and prior documents are not preserved without such modifications.

In another disclosed embodiment, such documents, prior to modification, are preserved within the document management system, subject to recovery via an audit capability and with only the most recently modified version displayed.

Further, in another embodiment, such documents are version controlled and all versions of the documents are archived and subject to display as if each was a new and separate document. Metadata associated with the documents are displayed along with the documents.

As previously discussed, the document management system also can implement functionality that facilitates an authorized user's ability to change metadata, e.g., the non-system-generated metadata, on any document or for a group of documents within a folder. For example, after logging onto the document management site or portal, the user navigates to the page that displays documents. The user brings the selected document into view and moves the cursor into the part of the page that displays the metadata attached to the document. From that location, the user moves the cursor to the item of metadata that is to be changed and if such metadata is displayed as a drop down list, within or not within a modal display, the list appears with the currently selected description highlighted. By moving the cursor over the new description desired and left or right clicking (as appropriate), the user can modify the metadata associated with the document to the new selection. If such metadata is displayed as free form text, the user can select the text, highlight it in the same manner as in a word processing application, and retype the new metadata tag.

Further, the user can preserve such free form text metadata and add an additional free form text metadata tag by moving the cursor over an "Add Metadata" icon or words or similar phrase. The user can then right or left click the icon, words or phrase, as appropriate, to display a blank free form text metadata field for input of text. Thereafter, the user can input text into the metadata field.

In accordance with the various disclosed embodiments, the document management system described herein can integrate the storage of original paper documents with any document images stored in the system. For example, the metadata items selected to create the drop down list for "Location of Original" are actual locations, such as a numbered safe deposit box at a financial institution, or a file folder with a matching name, stored in a matching location, such as the "top left drawer of my desk". Instead of a drop down list, a text box may be provided to allow for user input of the location of the original.

Upon selection or input of the "Location of Original" metadata, the user then places the paper original in a matching file or location. If the paper original is relocated, the user can access the document management system through a website or access portal, navigate to the document viewing page, bring the appropriate document into view and modify the metadata, such as in the manner described above.

In some cases, there may not be a paper original. In that case, the user, when selecting the metadata description associated with the document's location, can select "No Original/Original Destroyed" or similar phrase or identification.

8. Audit Trail or History

Given the sensitive nature of some of the stored documents, it may be important to keep track of access or modification of any documents or information associated therewith. As such, the document management system can include functionality that creates a complete audit trail for every document and user. For example, the dates, times and parties conducting all uploads, downloads, deletions and viewings are recorded and preserved. All logins (or logons) are recorded and, if available, information identifying the device from which the login was initiated is also recorded. The document management system also records and preserves all changes to metadata, the party making such change and the time and date of such change.

In another embodiment, the dates, times, and parties modifying any document stored in any List Folder are recorded and preserved along with the modifications and the unmodified document.

In yet another embodiment, an audit trail is available for viewing upon demand by any authorized user by navigating to a page with this capability in the document management site or portal. Input fields are displayed, which enable the user to narrow the range of the audit trail.

9. Search Capability

The document management system can include functionality that provides the user with the ability to search all or selected documents uploaded into the user's portion of the storage database and identify a particular document or documents for viewing based on parameters established for such search.

In an exemplary embodiment, the user can log in to the document management site or portal, and navigate to a "Search" page that displays blank fields to define parameters of a search. The fields include, but are not limited to all metadata fields such as: document name, location of original, date parameters for upload, download or viewing, a free form text field for any tag, name of the party the document involves, parties having access to such document, or date of notice. The search capability includes a function that permits the user to select the type of search to be performed, including Boolean and non-Boolean searches.

Upon activating or initiating a search, the system returns those documents meeting or satisfying the search criteria or a message that no documents meeting such criteria were found. The returned documents are displayed on a portion of the Search page along with their associated metadata. The order in which they are displayed is determined by a ranking assigned by the searching criteria used, or can be reset by the user by moving the cursor to a display on the page providing display options.

In another embodiment, the documents returned by the search function are displayed on a document display page.

In a further embodiment, the searching capability includes a visual display of each folder, subfolder and document in a tree structure for each folder and subfolder. The tree structure of folders can be expanded to show (i) the names of all documents in one or more folders, (ii) expandable thumbnails of a first page of each document, which are further expandable to all pages of such document, and (iii) a default viewing of the last three (3) documents (or last predefined number of documents) uploaded to each folder or subfolder, with unlimited viewing expansion.

D. Exemplary Scenarios

The following are three scenarios on how the method and system may be used.

Scenario 1

A 60 year old man and his 65 year old sister live 50 miles apart. Their father dies, leaving their elderly mother a widow. In the course of assisting their mother in settling their father's affairs, they and their mother ask the attorney handling the deceased father's estate to draft a will, a living will and power of attorney for their mother and to transfer their mother's primary asset, e.g., her residence, to a trust. The original will is given to the man for safekeeping in his safe deposit box and two originals of the powers of attorney and the living will are given to the man and his sister.

The man establishes an account with the document management system, for his mother. He gives upload access to the attorney. The attorney uploads an image of the power of attorney, the living will, and the trust documents, all signed by the mother to the document management system, such as through the system's website (or access portal, or other user interface). He also uploads a copy of the will.

In this example, the man accesses the system website using drop down menus, and selects his safe deposit box as the location for the documents. His sister also has full access to the system website, and identifies the location of her originals as the top right desk drawer in her home office.

The mother lives close to, but not with, the sister. The sister is the primary care giver. One day, while the sister is visiting her mother, she realizes that her mother is in need of emergency medical care and has an ambulance take them both to the hospital. The brother comes to the hospital, and important medical decisions must be made. Neither the man nor his sister has access, at that time, to the paper originals of the power of attorney and the living will. However, they have access to the Internet through a hospital computer and to a printer at the hospital. They access the system website and print out the necessary documents, thereby eliminating any delay in executing important medical decisions.

The man and his sister both take advantage of the system for themselves and gradually populate the system website with their life insurance policies, health insurance cards, will, living will, powers of attorney, a list of all Internet accounts and the location of all their passwords, and other documents. They notify their children, for example, through email, advising them of the existence of the system and provide them with read-only access.

Scenario 2

A young man graduates from law school, passes the bar and becomes employed by a law firm. On his own in a large city, the man realizes that he may be changing apartments every year as his income grows. He is busy, and tries to transact most of his business over the Internet. He buys insurance from two on-line insurers. He has accounts at two brokerage firms and two banks, and also contributes to a retirement account through his employer's 401K plan. He is already building a significant portfolio.

When possible, he opts to receive receipts by email. He has business-related expenses, some of which are reimbursed by his employer and others he intends to take as tax deductions. He has been accumulating furniture and digital equipment.

He has an account with a website that implements the document management system disclosed herein. One day, in late March, his apartment is burglarized and his digital and other items are stolen. The file cabinets and a desk drawer in his apartment office have been opened, with some documents possibly missing.

Going onto the system website, he immediately finds the number for his renter's insurance policy and makes a claim. In support of the claim, he is able to provide receipts that he uploaded to the site through pictures taken with a smart phone. Other receipts that he received by email were forwarded to the website and those are also used to support the claim. He previously took pictures of items in his apartment, which were also uploaded onto the site. These pictures are also transmitted to the insurance company in support of the claim.

He views a page on the site that has his credit card numbers, identifies the number or each card and the number to call for possible fraud. At around the same time, he was preparing his taxes. He is able to recover an electronic copy of all the receipts that are needed to support his business deductions. Further, he has on the site a copy of his lease. He can review the lease to determine if there is any potential basis for early termination without penalty.

In addition, none of the documents maintained through on the system website are stored on his person devices (e.g., his laptop), and thus, his concerns about identity theft are significantly mitigated. For example, he can upload an electronic copy of his 401K statements onto the website and shred the originals, thereby preventing them from falling into criminal hands and reducing his potential as a wealthy target.

Scenario 3

A daughter graduates from college. After having lived away from home for the last four (4) years, she moves back in with her parents. She was a good student during college, and received many awards as well as glowing letters of recommendation from professors and from places where she interned.

As her parents help her move back home, the usual confusion of a move makes her father somewhat concerned so he takes her letters of recommendation and awards and places them in a special file folder so they will not get lost. He puts the folder in a box, takes a picture of the box with his smart phone and packs the box in the truck.

From his smart phone he accesses his account on the website that implements the document management system disclosed herein. He drags the picture over to the folder marked "Personal", tags it with his daughter's name, and tags it with the description "Awards and Recommendations". Following a prompt, he also instructs the site to notify him, such as by an email, in one week, in order to remind him to get the box and put the awards and letters in a more accessible place. All of this takes about 30 seconds.

He forgets about the file, but one week later receives the email notification. He finds the box in the basement and removes the folder. He accesses the site and changes the location of the folder to a pre-selected location from a drop down menu, such as to "The bottom left drawer of my desk." He does not scan all the documents, but simply uses the picture from his smart phone as the identifier.

One month later, his daughter tells him at 10:00 pm that she is going to an interview the next morning and needs one of the original letters of recommendation. He realizes that he has no idea where it is. However, he accesses the site, searches her name and then sees the "Awards and Recommendations" file under it. He sees the data display showing the location of the paper originals. He then opens and searches "The bottom left drawer of my desk", thumbs through a couple of folders, finds the file and retrieves an original letter of recommendation for his daughter.

Thus, the document management system described herein can provide access to stored documents not only in the event of an emergency, but whenever those documents are needed. The system can offer prompts to make it easier to input data about the documents, and send reminders to help a user remember the existence and location of important documents, whether such documents are in either paper or digital form. The system enhances security of the documents with encrypted storage and transmission, by obviating the need for their placement on local memory (e.g., a user device's hard drive and a user's flash drive), and by enabling the user to destroy unneeded paper originals, if desired. The foregoing are simply a few examples of benefits that can be provided through the method and system disclosed herein.

D. Exemplary Components

Figure 8:
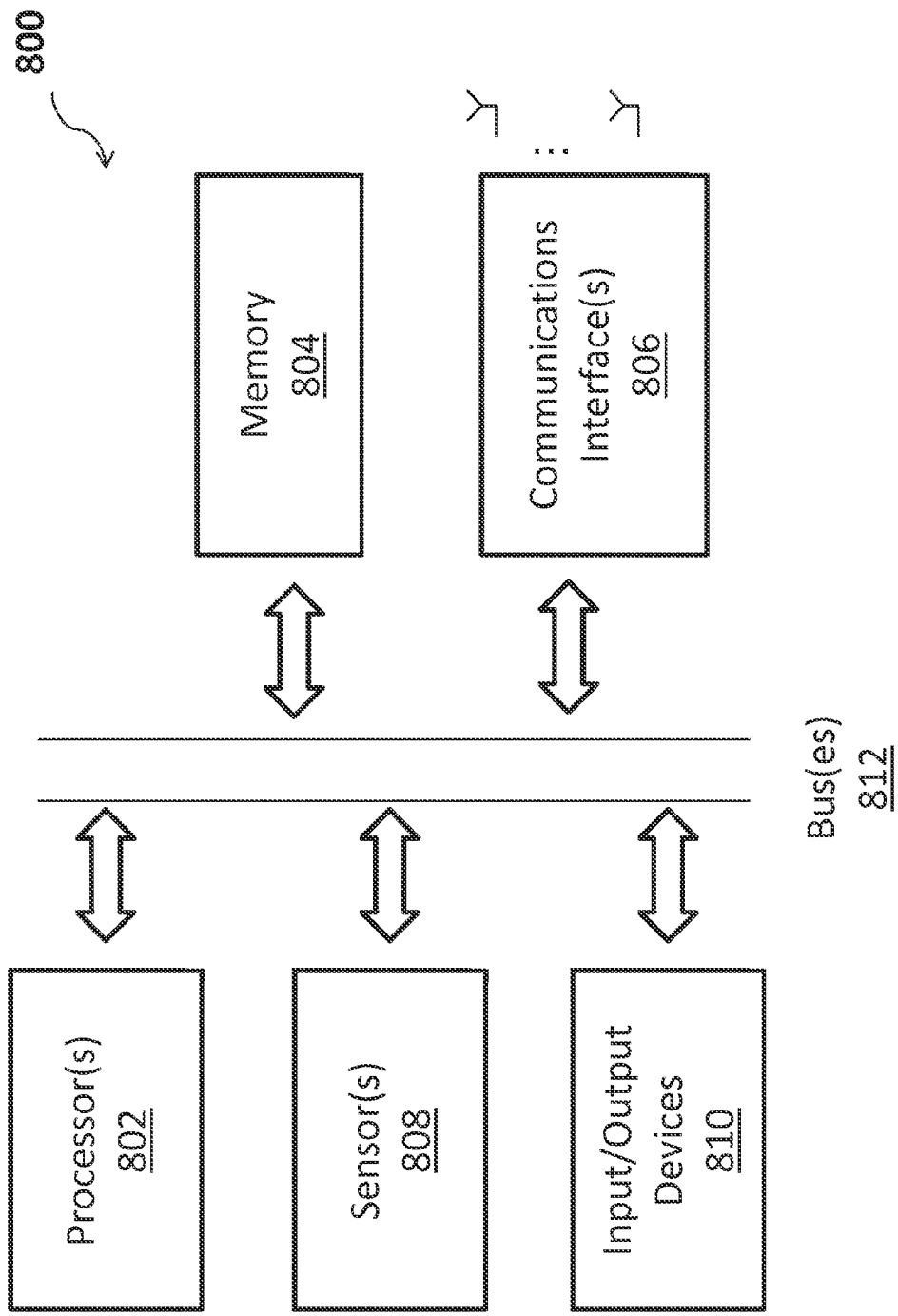
FIG. 8 is a block diagram of exemplary components of a user device in accordance with one disclosed embodiment.

FIG. 8 illustrates a block diagram of exemplary components of a user device 800, such as in FIG. 1 (e.g., 102 and 104), in accordance with a disclosed embodiment. The device 800 includes processor(s) (or controllers) 802, memory 804, communications interface(s) 806, sensor(s) 808, input/output device(s) 810, bus(es) 812 for interconnecting components of the device, and computer programs.

The memory 804 can be a non-transitory computer-readable storage medium used to store executable instructions, or computer program thereon. The memory 804 may include a read-only memory (ROM), random access memory (RAM), programmable read-only memory (PROM), erasable programmable read-only memory (EPROM), a hard drive, a smart card, a subscriber identity module (SIM), or any other medium from which a computing device can read executable instructions or a computer program or data. The term "computer program" is intended to encompass an executable program that exists permanently or temporarily on any computer-readable storage medium as described above.

The computer program also includes an algorithm that includes executable instructions stored in the memory 804 that are executable by the processor(s) 802, which may be facilitated by one or more of the application programs also stored on the memory 804. The application programs may also include, but are not limited to, an operating system or any special computer program that manages the relationship between application software and any suitable variety of hardware that helps to make-up a computer system or computing environment of device 800. For example, the computer program may also include a browser, email program, an application or app for interacting with a document management through an access portal or website, as discussed in this disclosure.

The communications interface(s) 806 include transmit and receive circuitry (or components) for conducting wireless or line-based communications with a network or network node, or other communications-enabled devices. For example, the communications interface(s) can include line-based interface(s), and one or more transmit antennas and one or more receive antennas for conducting wireless communications.

The sensor(s) 808 include a position sensor, touch sensor, audio sensor, accelerometer, inclinometer, compass, and gyro meter or other device for sensing characteristics, such as the environment of the device or the user.

The input/output device(s) 810 may include various input and output devices. For example, the input devices may include a touch input device (e.g., a keyboard, mouse, buttons, switches, touch display or screen, touchpad), audio input (e.g., a microphone), or a device that enables that user to provide information through some other medium. For example, the sensors can be used to sense user input (e.g., user motions). The output devices may include a visual output device (e.g., a display), an audio output device (e.g., speaker), a vibrational output device or a device that provides information to a user through some other medium.

FIG. 9 illustrates a block diagram of exemplary components of a server 900, such as in FIG. 1 (e.g., 110), in accordance with an embodiment. The server 900 includes processor(s) (or controllers) 902, memory 904, communications interface(s) 906, bus(es) 908 for interconnecting components of the network node, and computer programs.

The memory 904 can be a non-transitory computer-readable storage medium used to store executable instructions, or computer program thereon. The memory 904 may include a read-only memory (ROM), random access memory (RAM), programmable read-only memory (PROM), erasable programmable read-only memory (EPROM), a smart card, a subscriber identity module (SIM), or any other medium from which a computing device can read executable instructions or a computer program. The term "computer program" is intended to encompass an executable program that exists permanently or temporarily on any computer-readable storage medium as described above.

The computer program also includes an algorithm that includes executable instructions stored in the memory 904 that are executable by the processor(s) 902, which may be facilitated by one or more of the application programs also stored on the memory 904. The application programs may also include, but are not limited to, an operating system or any special computer program that manages the relationship between application software and any suitable variety of hardware that helps to make-up a computer system or computing environment of server 900. For example, the computer program also includes programs and codes to implement the various document management processes, as discussed in this disclosure.

The communications interface(s) 906 include transmit and receive circuitry (or components) for conducting wireless or line-based communications with a device. For example, the communications interface(s) can include line-based interface(s) such as for communications with other network components, and one or more transmit antennas and one or more receive antennas for conducting wireless communications.

The various apparatus, methods, flow diagrams, and structure block diagrams described in this disclosure may be implemented in a computer processing system including program code comprising program instructions that are executable by the computer processing system. Other implementations may also be used. Further, the flow diagrams and structure block diagrams described in the present disclosure, which describe particular methods and/or corresponding acts in support of steps and corresponding functions in support of disclosed structural means, may also be utilized to implement corresponding software structures and algorithms, and equivalents thereof.

The various exemplary embodiments described in this disclosure can be implemented as one or more computer program products, i.e., one or more modules of computer program instructions encoded on a tangible program carrier for execution by, or to control the operation of, data processing apparatus. The computer readable medium can be a machine readable storage device, a machine readable storage substrate, a memory device, a composition of matter effecting a machine readable propagated signal, or a combination of one or more of them.

A computer program (also referred to as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by a processing system. For example, one or more programmable processors or digital signal processors (DSPs) can execute one or more computer programs to perform functions by operating on input data and generating output. The processes and logic flows can also be performed by special purpose logic circuitry, e.g., an FPGA (field programmable gate array) or an ASIC (application specific integrated circuit) or CPLD (Complex Programmable Logic Device), or a combination of various processors and special purpose logic circuitry.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

To provide for interaction with a user, the disclosed embodiments can be implemented on a computer or computing device (e.g., user devices 102 and 104 in FIG. 1) having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. The computing system can include clients and servers. A client and server are generally remote from each other and typically interact through a communication network. The relationship of client and server arises by virtue of computer programs running on the respective computers and having a client server relationship to each other.

While this disclosure contains many exemplary implementations, they should not be construed as limitations on the scope of any invention or of what may be claimed, but rather as descriptions of features that may be specific to particular embodiments of particular inventions. Certain features that are described in this disclosure in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the disclosed embodiments should not be understood as requiring such separation in all embodiments, and it should be understood that the described program components and systems can generally be integrated together in a single software product or packaged into multiple software products.

The invention claimed is:

1. A computer-implemented method for organizing, storing and accessing personal and business financial, legal and other documents, whether in paper form, digital form, or both, through a document management system including:
   a computer that supports the operations of a website comprising at least a web-based user interface, wherein access to at least one portion of the web-based user interface is limited to administrators, authorized users and third parties designated by users, and
   at least two databases including a first storage database and a second storage database,
   the method comprising:
      providing the first storage database for receiving and storing documents exported thereto through the web-based user interface;
      storing documents in the first storage database in an encrypted manner;
      providing the second storage database for storing items of data concerning each document;
      linking each document in the first storage database with one or more items of data stored in the second storage database, each item of data being either generated by the system or generated by an owner of the document, three items of data being generated by the system and comprising an identification of a party uploading the document, a time and date of the upload and a record of the last three or more times the data has been viewed or altered along with the name of a party who altered or viewed the document;
      providing two or more dropdown menus of data viewable on the web-based user interface, the dropdown menus to be selected for association with any document uploaded, the two or more dropdown menus comprising items selected or input by the owner through the web-based user interface to create a dropdown menu that identify the location of a paper original of the document uploaded and a dropdown menu of data items generated by the owner of the document which includes the name of parties who have access to such documents and a type of access, including upload, download or read-only, and a date such permitted access is no longer available;
      providing owner-designated and inputted tags that comprise of both a freeform text identifier for a party who has been granted access by the owner via the web-based user interface to the uploaded document and a dropdown menu of such freeform text identifiers that have been previously input by the owner and a freeform text identifier and a dropdown menu of such freeform text identifiers that have been previously input by the owner for any other purpose;
      providing an audit trail of all activities involving any document uploaded to the system through the web-based user interface or any changes to associated data or any changes to the owner-created drop down menus;
      providing a check box viewable through the web-based user interface that is selectable by the owner of a document and that once selected prompts the owner of such document to input a short free form text message and input a date, or select a date from a predetermined drop-down menu upon which the system generates an electronic communication message to be sent to the owner, or other party as selected, wherein the electronic communication message reminds the owner to take an action concerning such document, including the transmission in such electronic communication message of the free form text so entered;
      providing a drag-and-drop capability for enabling a cursor-controlled upload of documents or images thereof stored on the owner's device directly to the first storage database;
      providing an email account connected through the web-based user interface that permits the owner to accept emails and upload attachments to such emails without having to export the attachments to the owner's device or other device prior to upload to the first storage database;
      providing an image compiler for sorting and combining multiple images into a single document;
      notifying one or more selected third parties of a possible incapacity or death of the owner of a document based on a preset condition;
      allowing the user to identify and assign a third party with all or selected rights, privileges and access to all or selected documents stored in the first storage database and all or selected rights, privileges and access to and rights to make changes to, all data entered into the first and second storage databases that the user can enter or change;
      allowing the user to identify and assign a third party with rights to view all or selected documents stored in the first storage database and the rights to view the data in all storage databases that the user can view; and
      providing a combination of symmetric and asymmetric encryption to secure data and documents from unauthorized access.

2. The method of claim 1 wherein a non-storage database is implemented in an on-line environment, including a website.

3. The method of claim 1, further comprising granting access, through the web-based interface, to the storage databases to an authorized user based on a single or multi-factor authentication scheme.

4. The method of claim 1, further comprising granting access, through the web-based interface, for a limited time, to the storage databases to a third party, authorized by an authorized user based on name, password or multi-factor authentication and date of access selected by the authorized user as input by the authorized user into a non-storage database.

5. The method of claim 1 further comprising granting access, through the web-based interface, to certain owner-selected folders or documents based on registration of a device used to access the web-based interface.

6. The method of claim 5, further comprising granting access, through the web-based interface, to certain owner-selected folders or documents based on a response to pre-selected questions if not accessing such web-based interface with a pre-registered device.

7. The method of claim 1, further comprising inputting, through the web-based interface, into the second storage database with both predetermined and authorized user-created fields, data identifying a potential location of original or paper documents whose images are stored in the first storage database.

8. The method of claim 7, further comprising: accessing and viewing data through a drop-down menu prior to uploading an image of a document to the first storage database.

9. The method of claim 7, further comprising:
associating, through the web-based interface, selected data with an image of a document stored in the first storage database; and
viewing, through the web-based interface, the document and the associated selected data together through the web-based interface.

10. The method of claim 9, further comprising: displaying upon a cursor selection, through the web-based interface, a drop-down menu for modifying a selection of the data displayed with the document and reselecting the same or different data as displayed and associating the new data selected with the document.

11. The method of claim 1, further comprising: inputting, through the web-based interface, into a second storage database with both predetermined and authorized user-created fields, data identifying third parties to whom access to the documents whose images are stored in the first storage database is given.

12. The method of claim 11, further comprising: inputting, through the web-based interface, into the fields of the second storage database, data identifying a date on which a third party's access to a document expires.

13. The method of claim 11, further comprising: inputting system-generated data into the fields of the second storage database, including a default date of one year (365 days or 366 days for leap years) from a date a document's image was input into the first storage database as a time frame in which a third party's access to a document expires.

14. The method of claim 11, further comprising: accessing and viewing data through a drop-down menu prior to uploading an image of a document to the first storage database.

15. The method of claim 11, further comprising:
associating, through the web-based interface, selected data with an image of a document stored in the first storage database;
viewing, through the web-based interface, the document and the associated selected data together through the web-based interface; and
displaying upon a cursor selection, through the web-based interface, a drop-down menu for modifying a selection of the data displayed with the document and reselecting the same or different data as displayed and associating the new data selected with the document.

16. The method of claim 1, further comprising:
displaying, through the web-based interface, a checkbox for prompting a document's owner to request a future notice generated by the system concerning any document;
displaying a field, if such checkbox is checked, for access to a date through a drop down menu enabling the user to select future dates by choosing from the menu periods of one month, three months, six months, one year or five years;
displaying a field for input of a date of the requested notice, in the format mm/dd/yyyy;
displaying, through the web-based interface, a free form text field to be transmitted as part of a future notice;
displaying, through the web-based interface, a field, if such checkbox is checked, of a dropdown menu having email addresses, including the user's email address, as the address to which a future notice is to be sent; and
displaying, through the web-based interface, a semi-free form field for input of an email address not included on a dropdown menu, an email address's form being verified for validity as an email address, to which a future notice is to be sent.

17. The method of claim 16, further comprising: transmitting a system-generated email for advising the user when and that a future email was transmitted, and a date and time of the transmission and notice if the email was undeliverable.

18. The method of claim 1, further comprising:
displaying, through a web-based interface, a free form text field for enabling the user to input text concerning any issue, including instructions concerning any matter, that the user desires to have transmitted to any selected party upon a determination that the user is incapacitated or deceased;
displaying, through the web-based interface, a dropdown menu having a time period to be selected by the user, including two weeks, one month, two months, three months, six months, one year, or other time as determined; and
transmitting a system-generated notice to a selected contact address of a device or a person or entity on a date on which the selected time period expires, and if no response to the notice is received by the system after expiration of the selected time period, a message is transmitted to a pre-selected device of another person or entity,
wherein the contact address is an address for communicating an email, a text message, a video message, audio message or other electronic or non-electronic communication message.

19. The method of claim 1, further comprising:
displaying, through the web-based interface, a free form text field for user input of a name of a third party who is granted rights to view the user's documents and data in all;
displaying, through the web-based interface, a semi-free form field for input of an email address not included on a dropdown menu, a form of the email address being verified for validity as an email address of the third party;
generating by the system an email to a selected email address;
advising the recipient of the recipient's rights, privileges and access and a system-generated temporary name and password; and
enabling the recipient to access documents and data, and to create a permanent name and password.

\* \* \* \* \*